(12) United States Patent  (10) Patent No.: US 8,459,028 B2
Klassen et al.  (45) Date of Patent: Jun. 11, 2013

(54) ENERGY TRANSFER MACHINE AND METHOD

(76) Inventors: James B. Klassen, Langley (CA); David W. Boehm, Summerland (CA)

( * ) Notice: Subject to any disclaimer, the term of this patent is extended or adjusted under 35 U.S.C. 154(b) by 1003 days.

(21) Appl. No.: 12/141,713

(22) Filed: Jun. 18, 2008

(65) Prior Publication Data

US 2009/0165461 A1  Jul. 2, 2009

Related U.S. Application Data

(60) Provisional application No. 60/944,786, filed on Jun. 18, 2007.

(51) Int. Cl.
*F01K 13/00* (2006.01)
*F01K 25/02* (2006.01)

(52) U.S. Cl.
USPC .................................. 60/645; 60/650; 60/682

(58) Field of Classification Search
USPC ................ 60/643, 645, 650, 670, 682–683
See application file for complete search history.

(56) References Cited

U.S. PATENT DOCUMENTS

| | | | |
|---|---|---|---|
| 1,306,865 A | 6/1919 | Stoddard | |
| 2,988,874 A * | 6/1961 | Ray et al. | 60/670 |
| 3,767,325 A | 10/1973 | Schuman | |
| 3,782,859 A | 1/1974 | Schuman | |
| 3,797,247 A * | 3/1974 | Schwartzman | 60/682 |
| 3,861,166 A | 1/1975 | Goldsberry | |
| 3,988,901 A | 11/1976 | Shelton et al. | |
| 3,990,243 A * | 11/1976 | Davoud | 60/653 |
| 4,009,587 A | 3/1977 | Robinson, Jr. et al. | |
| 4,072,010 A | 2/1978 | Schuman | |
| 4,077,221 A | 3/1978 | Maeda | |
| 4,132,505 A | 1/1979 | Schuman | |
| 4,215,548 A | 8/1980 | Beremand | |
| 4,269,040 A | 5/1981 | Grundman | |
| 4,353,212 A * | 10/1982 | Adler | 60/622 |
| 4,476,681 A | 10/1984 | Dineen | |
| 4,578,956 A | 4/1986 | Young | |
| 4,765,144 A * | 8/1988 | Spacer | 60/692 |
| 4,779,427 A | 10/1988 | Rowley | |
| 5,336,059 A * | 8/1994 | Rowley | 417/348 |
| 5,414,997 A * | 5/1995 | Tailer | 60/516 |
| 5,467,600 A * | 11/1995 | Kuroiwa | 62/6 |
| 5,537,823 A * | 7/1996 | Vogel | 60/682 |
| 5,737,925 A | 4/1998 | Sekiya et al. | |
| 5,924,305 A | 7/1999 | Hill | |
| 6,735,946 B1 | 5/2004 | Otting et al. | |
| 6,874,321 B2 | 4/2005 | Ogura | |
| 7,134,279 B2 | 11/2006 | White et al. | |
| 7,331,180 B2 * | 2/2008 | Marnoch | 60/645 |
| 2007/0089410 A1 | 4/2007 | Yoshimura et al. | |

FOREIGN PATENT DOCUMENTS

| | | |
|---|---|---|
| CA | 1305155 | 9/1992 |
| CA | 2635336 | 12/2008 |
| GB | 2333131 | 7/1999 |

\* cited by examiner

*Primary Examiner* — Hoang Nguyen
(74) *Attorney, Agent, or Firm* — Scott D. Swanson; Frank J. Dykas; Dykas & Shaver

(57) ABSTRACT

A novel engine for producing power from a temperature differential with additional benefits of low cost, high efficiency, quiet operation minimal wear of components, and the ability to produce power or cooling from low grade heat sources.

62 Claims, 16 Drawing Sheets

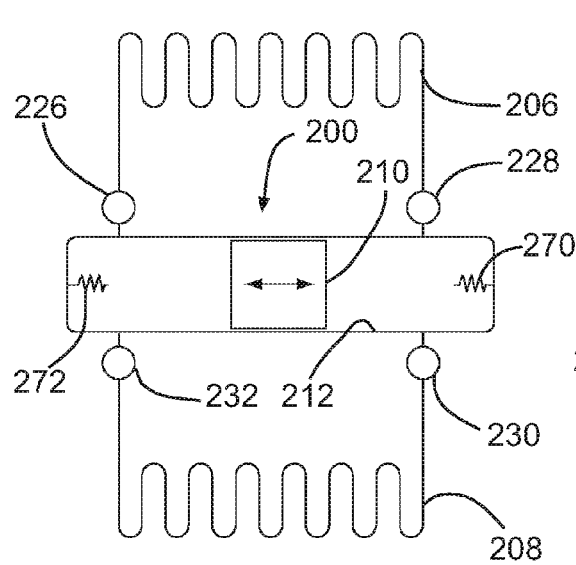
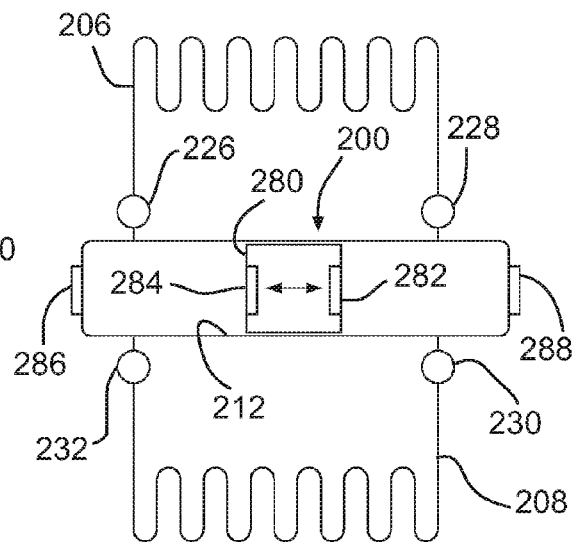
FIG. 17 FIG. 18
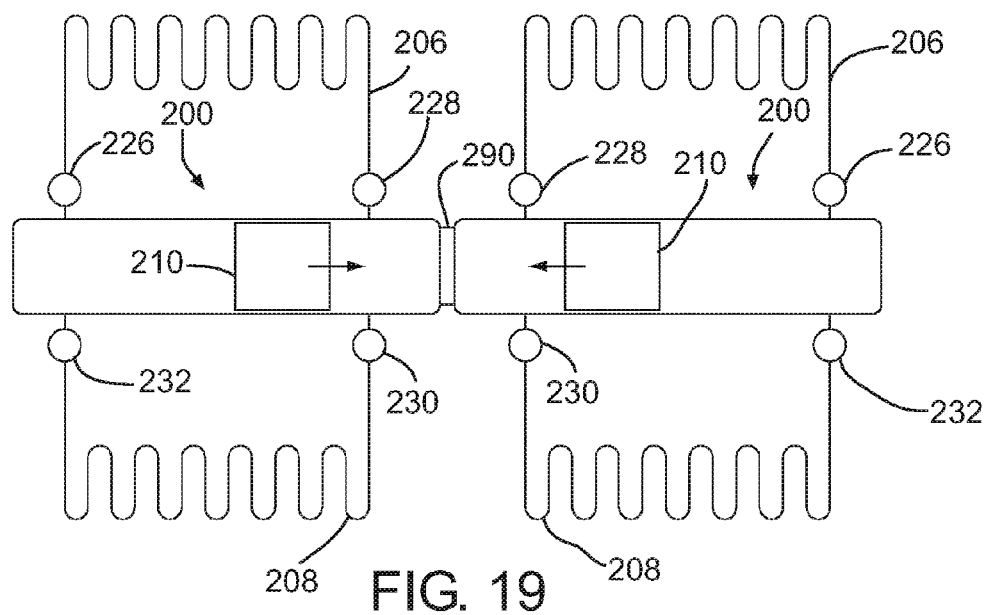
FIG. 19

ENERGY TRANSFER MACHINE AND METHOD

TECHNICAL FIELD

This relates to the technical field of energy transfer, and in particular relates to cold cycle engines, and heating and cooling pumps.

BACKGROUND

A conventional heat engine, such as a Stirling engine, is able to produce power from an external heat source. The heat source may be low cost or free, such as waste heat from a manufacturing process, but the Stirling cycle itself requires a heavy and expensive engine resulting in prohibitive cost and weight for many applications. Another limitation of the Stirling engine is that working fluid must be heated and cooled with every cycle of the engine. This limits the speed at which the engine can operate and requires sophisticated heat exchangers.

Other conventional heat engines, such as steam engines that use the Rankine cycle, require the working fluid in the engine to change phases during operation of the engine. For a particular operating fluid, such as water, the engine requires a heat source at a temperature at over the boiling point of the operating fluid, 100 degrees Celsius for water, in order for the fluid to change to steam during the Rankine cycle. The Rankine cycle is not easily implemented in applications where the temperature at the heat source changes over time or where only small variations in temperature are available to operate the engine.

SUMMARY

In an embodiment there is an energy transfer machine comprising passageways defining a closed loop and containing a compressible fluid, which is at least in part pressurized above atmospheric pressure during normal operational conditions. The compressible fluid has a constant phase in the closed loop. A pressure-displacement coupled interface is on the closed loop and divides the closed loop into a first energy transfer circuit and a second energy transfer circuit. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the closed loop. An input-output device is coupled to the pressure-displacement coupled interface to input energy into or extract energy from the pressure-displacement coupled interface.

In another embodiment there is an energy transfer machine comprising passageways defining a closed loop and containing a compressible fluid preferably above atmospheric pressure. A pressure-displacement coupled interface on the closed loop divides the closed loop into a first energy transfer circuit and a second energy transfer circuit. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are rotary valves coordinated to allow the pulsed flows in the first energy transfer circuit and the second energy transfer circuit to combine to create flow around the closed loop. An input-output device is coupled to the pressure-displacement coupled interface to input energy into or extract energy from the pressure-displacement coupled interface. The rotary valves are preferably electrically actuated and preferably spin in a continuous direction.

In another embodiment, there is an energy transfer machine comprising passageways defining a closed loop and containing a compressible fluid, preferably at above atmospheric pressure, and a pressure-displacement coupled interface comprising an electromagnetically controlled spinning piston contained within a conduit extending between sides of the closed loop at different pressure and dividing the closed loop into a first energy transfer circuit and a second energy transfer circuit, the conduit forming at least in part a cylinder. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The electromagnetically controlled spinning piston has at least a portion configured to function as at least part of the first flow control devices and the second flow control devices. The first flow control devices and the second flow devices are coordinated to allow the pulsed flows in the first energy transfer circuit and the second energy transfer circuit to combine to create flow around the closed loop. An input-output device is coupled to the pressure-displacement coupled interface to at least one of input energy into and extract energy from the pressure-displacement coupled interface. The purpose of the spinning piston is to act as an integrated rotary valve device so additional valves are not needed. In some applications, this configuration may be used in combination with passive check valves.

In another embodiment there is an energy transfer machine, comprising passageways defining a closed loop and containing a compressible fluid. A pressure-displacement coupled interface comprising a piston is contained within a conduit extending between sides of the closed loop at different pressure and dividing the closed loop into a first energy transfer circuit and a second energy transfer circuit. In operation, the first energy transfer circuit and second energy transfer circuit have differential pressure, with one at higher pressure than the other. Depending on time of operation, this pressure differential may be reversed. Respective rebound devices lie between the piston and opposed ends of the conduit. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the closed loop. An input-output device is coupled to the pressure-displacement coupled interface to input energy into or extract energy from the pressure-displacement coupled interface.

In another embodiment there is an energy transfer machine, comprising passageways defining a closed loop and containing a compressible fluid. A pressure-displacement coupled interface comprises piezoelectric transducers or electroactive materials on sides of the closed loop at different pressure in operation and divides the closed loop into a first energy transfer circuit and a second energy transfer circuit. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the closed loop. An input-output device is coupled to the pressure-displacement coupled interface to input energy into or extract energy from the pressure-displacement coupled interface.

In another embodiment there is a method of energy transfer, comprising containing compressible fluid within passageways defining a closed loop, the compressible fluid having constant phase in the closed loop. A pressure-displacement coupled interface is provided on the closed loop and divides the closed loop into a first energy transfer circuit and a second energy transfer circuit, with different pressure in the first energy transfer circuit than in the second energy transfer circuit. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the closed loop. An input-output device is coupled to the pressure-displacement coupled interface to input energy into or extract energy from the pressure-displacement coupled interface.

In another embodiment there is a method of energy transfer, comprising containing compressible fluid within passageways defining a closed loop. A pressure-displacement coupled interface is provided on the closed loop and divides the closed loop into a first energy transfer circuit and a second energy transfer circuit, with different pressure in the first energy transfer circuit than in the second energy transfer circuit. First flow control devices are coordinated on the first energy transfer circuit to permit pulsed flow through the first energy transfer circuit with energy transfer through the pressure-displacement coupled interface. Second flow control devices are coordinated on the second energy transfer circuit to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the closed loop. The pressure-displacement coupled interface comprises at least one of: a free spinning piston in a conduit extending between opposed sides of the closed loop, at least a piston in a conduit with rebound devices between ends of the conduit and the piston, a diaphragm in a conduit extending between opposed sides of the closed loop, a piezoelectric transducer exposed to pressure on opposed sides of the closed loop, electroactive materials on one or both sides of the closed loop, and respective piezoelectric transducers on opposed sides of the closed loop. An input-output device is coupled to the pressure-displacement coupled interface to input energy into or extract energy from the pressure-displacement coupled interface.

In another embodiment there is an energy transfer machine, comprising a sealed pressure chamber comprising a cylinder having a hot end and a cold end. A free piston is placed for reciprocal motion within the cylinder. The free piston separates the hot end of the cylinder from the cold end of the cylinder and the free piston has opposed ends with equal surface area. An electrical generator is coupled to the free piston for converting the reciprocal motion of the free piston into electrical energy. A hot circuit and a cold circuit are connected through the cylinder to form a single fluid loop. A plurality of valves separates the hot and cold circuit from the cylinder. The valves comprise a hot inlet valve lying on the hot end of the cylinder and forming a fluid seal between the hot circuit and the hot end of the cylinder, a hot discharge valve lying on the hot end of the cylinder and forming a fluid seal between the cold circuit and the hot end of the cylinder, a cold inlet valve lying on the cold end of the cylinder and forming a fluid seal between the cold circuit and the cold end of the cylinder and a cold discharge valve lying on the cold end of the cylinder and forming a fluid seal between the hot circuit and the cold end of the cylinder.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 17 is a schematic view of an energy transfer machine with bounce springs;

FIG. 18 is a schematic view of an energy transfer machine with magnetic bounce springs;

FIG. 19 is a schematic view of an energy transfer machine with two opposed pistons;

DETAILED DESCRIPTION

Figure 1:
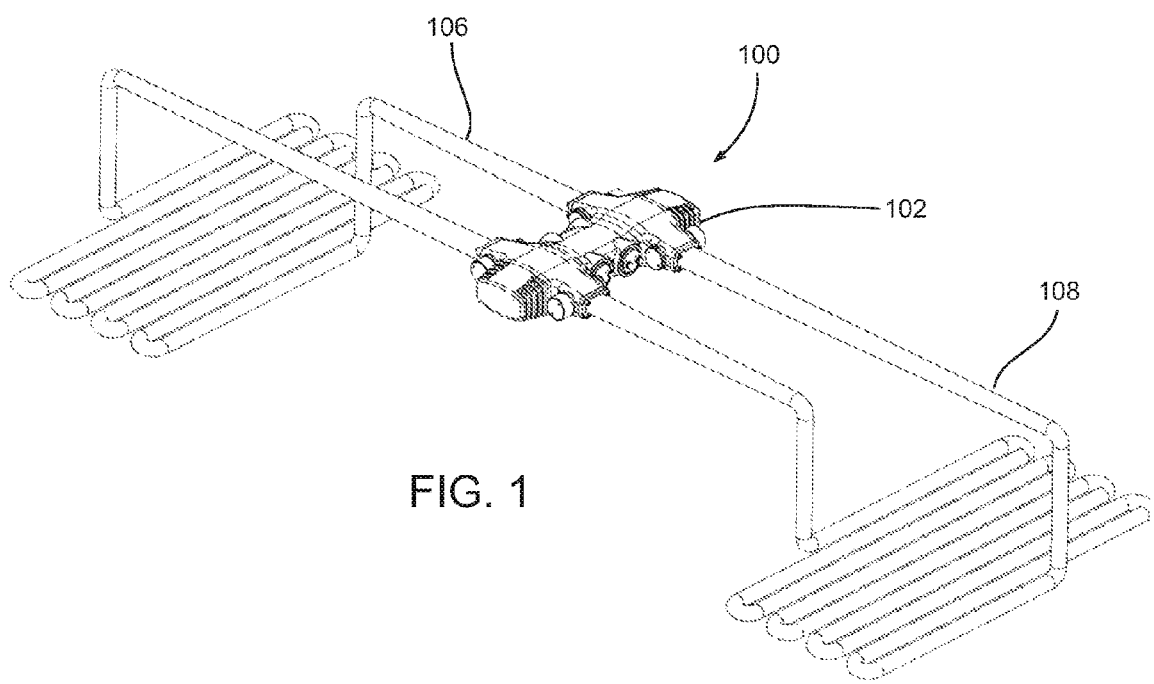
FIG. 1 is a perspective view of an energy transfer machine.

Immaterial modifications may be made to the embodiments described here without departing from what is covered by the claims. In this patent document, the terms hot and cold are used as relative terms indicating that the hot side is a higher temperature than the cold side. Similarly, a heat source is an object that has a higher relative temperature than the object that is receiving energy from the heat source.

An energy transfer machine is disclosed that converts a change of heat energy of a compressible fluid to motion of an interface or that converts motion of an interface to a change of heat energy. The motion of the interface may be used to do work in a variety of ways, such as to drive a machine, as for example a pump, or electrical generator. The energy transfer machine may also use energy such as electrical energy or mechanical energy to cause motion of an interface that acts on a compressible fluid to change the heat energy of the compressible fluid.

In various embodiments, the compressible fluid is contained within passageways that define a closed loop. In some embodiments, the compressible fluid has constant phase in the closed loop. In other embodiments, the compressible fluid changes phase in the closed loop. The passageways may be defined by any suitable material and may comprise a variety of constructions such as tubing, piping, channels or holes bored in substrates, channels etched in one substrate with another substrate forming a cap for the channel, channels or holes in semi-conductor chips or any other suitable passageways. Fluid flow in heat exchangers may divide into separate flow paths or remain in the same flow path as in the drawings.

The closed loop in different embodiments may include additional features such as heat exchangers, condensers, accumulators, heat sources, heat sinks and hot or cold reservoirs, which also may function as heat exchangers.

A pressure-displacement coupled interface on the closed loop divides the closed loop into a first energy transfer circuit and a second energy transfer circuit. The pressure-displacement coupled interface also transfers energy from one energy transfer circuit to the other energy transfer circuit. In one example, expansion of a cold chamber is possible due to kinetic energy stored in the piston from the hot side expansion and conserved through the bounce phase at the cold end of the cylinder. The two circuits thus in this embodiment interact intermittently). The pressure-displacement coupled interface may take any of various forms. The pressure-displacement coupled interface is displaced in response to pressure changes on each side of the closed loop and as a consequence moves in response to pressure fluctuations or imbalances in the closed loop. The pressure-displacement coupled interface may be formed of one or more parts that are coupled together. In one embodiment, the pressure-displacement coupled interface comprises a passageway or conduit forming a short circuit across the closed loop with a free piston in the passageway. Pressure differentials across the closed loop cause the free piston to move through the conduit. Depending on the pressure differentials, the free piston may move with varying amount of displacement.

In another embodiment, the pressure-displacement coupled interface may comprise a conduit with a pair of pistons that are coupled together in any of various ways so that the motion of one piston is coordinated with the motion of the other piston. The pistons may for example be coupled by a rod, or through an electrical interface. In another embodiment, the pressure-displacement coupled interface may comprise multiple conduits, each conduit having one or more coupled pistons inside that respond to pressure differentials in the closed loop. In another embodiment, the pressure-displacement coupled interface may comprise coupled piezoelectric transducers. The piezoelectric transducers convert movement to electrical energy or electrical energy to movement. Each side of the closed loop may include one or more piezoelectric transducers or may be on opposed sides of a single diaphragm or piezoelectric transducers. The piezoelectric transducers on one side of the closed loop may be coupled with the piezoelectric transducers on the other side of the closed loop through electronics so that movement of one set of piezoelectric transducers corresponds to movement of the other set of piezoelectric transducers, and may cause the corresponding movement.

The first energy transfer circuit comprises the closed loop on one side of the pressure-displacement coupled interface and the second energy transfer circuit comprises the closed loop on the other side of the pressure-displacement coupled interface. In some embodiments, the first energy transfer circuit may pass through a heat source and the second energy transfer circuit may pass through a heat sink. The energy transfer circuits operate in a pulsed manner as flow control devices open and close. While one of the energy transfer circuits operates, the other remains largely static.

Pressure differentials in the closed loop are controlled by flow control devices. In some embodiments, the flow control devices may comprise valves, such as rotary valves, piezoelectric valves, or other suitable valves. The flow control devices on the first energy transfer circuit are coordinated to permit pulsed flow through the first energy transfer circuit with energy transfer through the pressure-displacement coupled interface. Flow control devices on the second energy transfer circuit are coordinated to permit pulsed flow through the second energy transfer circuit with energy transfer through the pressure-displacement coupled interface. The flow control devices are coordinated to allow the pulsed flows in the first energy transfer circuit and the second energy transfer circuit to combine to create flow around the closed loop.

In one embodiment, the energy transfer machine is operated to convert heat energy to motion. In this instance, the energy source is a heat differential between some part of the first energy transfer circuit and some part of the second energy transfer circuit. Consider the first energy transfer circuit to be the hotter side, namely the hot circuit. The second energy transfer circuit is the cold circuit. In one embodiment, the hot circuit has an inlet flow control device adjacent the pressure-displacement coupled interface on one side of the closed loop that allows pressure from the hot circuit to press against part of the pressure-displacement coupled interface. In the case of the free piston, this may be one side of the free piston. In the case of the piezoelectric embodiment, this may be one of the piezoelectric transducers. The hot circuit has a discharge flow control device adjacent the pressure-displacement coupled interface on the other side of the closed loop. The cold circuit has corresponding inlet and discharge flow control devices on opposed sides of the pressure-displacement coupled interface. In one embodiment of an energy transfer machine, the flow control devices are valves coordinated in the manner shown in FIG. 12.

An input-output device is coupled to the pressure-displacement coupled interface to input energy into or extract energy from the pressure-displacement coupled interface. For example, the input-output device may be an alternator. In one embodiment, the alternator may be operated to convert motion of a moving part of the pressure-displacement coupled interface, such as movement of a free piston, into electrical energy. In another embodiment, the alternator may be operated to cause movement of a moving part of the pressure-displacement coupled interface and drive compressible fluid around the closed loop. In another embodiment, a piston is caused to rotate as it is oscillating in a conduit forming a cylinder between opposed side of the closed loop and is equipped with fluid flow ports so some or all of the fluid flow control is provided by the spinning piston as it interacts with fluid flow ports on the cylinder. In another embodiment, the input-output device may comprise a mechanical coupling to a motor or pump. In another embodiment, the input-output device may be an electrical interface coupled to piezoelectric transducers to transfer electrical energy from the piezoelectric transducers to perform work in another application. In another embodiment, the input-output device may provide electric energy to drive piezoelectric transducers or electroactive materials and cause a cooling effect in one side of the closed loop. In another embodiment, electrical energy from the expansion of one piezo transducer is used to perform work in another piezoelectric transducer.

In FIGS. 1-10 a first embodiment of an energy transfer machine 100 is shown. The energy transfer machine 100 has a body 102, which is connected to a hot reservoir 106 and a cold reservoir 108. The hot and cold reservoirs 106, 108 are also heat exchangers and may be referred to as hot heat exchanger 106 and cold heat exchanger 108. A piston 110 lies in a cylinder 112 in the interior of the body 102. On opposite sides of the piston are a hot end 116 of the cylinder 112 and a cold end 118 of the cylinder 112. A hot fluid inlet valve 126 separates the hot end 116 of the cylinder 112 from the hot reservoir 106. A cold fluid discharge valve 128 separates the cold end 118 of the cylinder 112 from the hot reservoir 106. A cold fluid inlet valve 130 separates the cold end 118 of the cylinder 112 from the cold reservoir 108. A hot fluid discharge valve 132 separates the hot end 116 of the cylinder 112 from the cold reservoir 108. The piston 110 is a free piston and is fitted with permanent magnets 124, 134 embedded within the piston 110. Four electromagnetic coils 136, 138, 140, 142 are embedded into the body 102 of the energy transfer machine 100.

Figure 2:
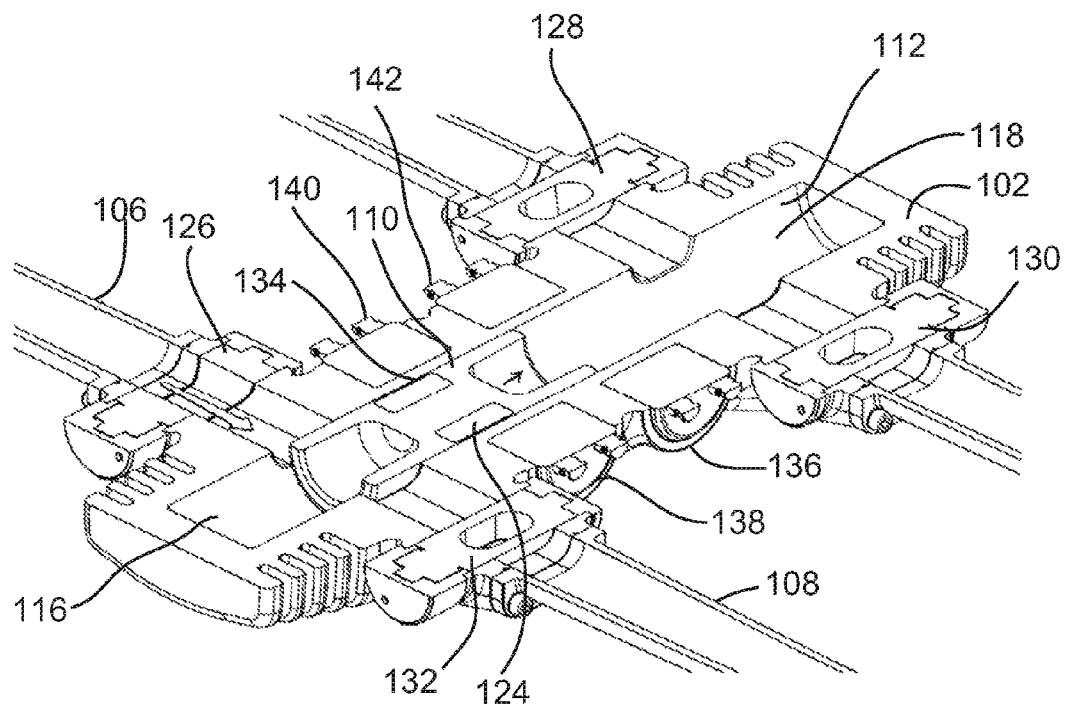
FIG. 2 is partial cutaway perspective view of an energy transfer machine.

The energy transfer machine 100 is shown in operation as a cold cycle engine in FIGS. 2-7. Compressible fluid passes through the hot reservoir 106 and the cold reservoir 108 during operation of the energy transfer machine 100. The hot and cold reservoirs 106 and 108 function as energy transfer circuits with the piston 110 alternately acting as part of either the hot reservoir 106 or the cold reservoir 108 as fluid flows through the energy transfer machine 100. The hot and cold reservoirs 106, 108 together form a closed loop of fluid flow through the body 102. The hot reservoir receives heat from a heat source (not shown) so that fluid that is discharged from the hot reservoir 106 has a higher temperature than fluid entering the hot reservoir 106. As shown in FIG. 2, the kinetic energy of the piston 110 is increased when a controlled mass of hot fluid is allowed to enter the hot end 116 of the cylinder 112 from the hot reservoir 106. The mass of hot fluid enters the cylinder 112 through the hot fluid inlet valve 126, thereby acting on the piston 110 and causing it to move axially within the cylinder 112. When a desired mass of hot fluid has entered the cylinder 112, the hot fluid inlet valve 126 closes. Movement of the piston may be used to create externally useful work such as by generating electricity with the magnets 124, 134 as they move past the electromagnetic coils 136, 138, 140, 142.

Figure 3:
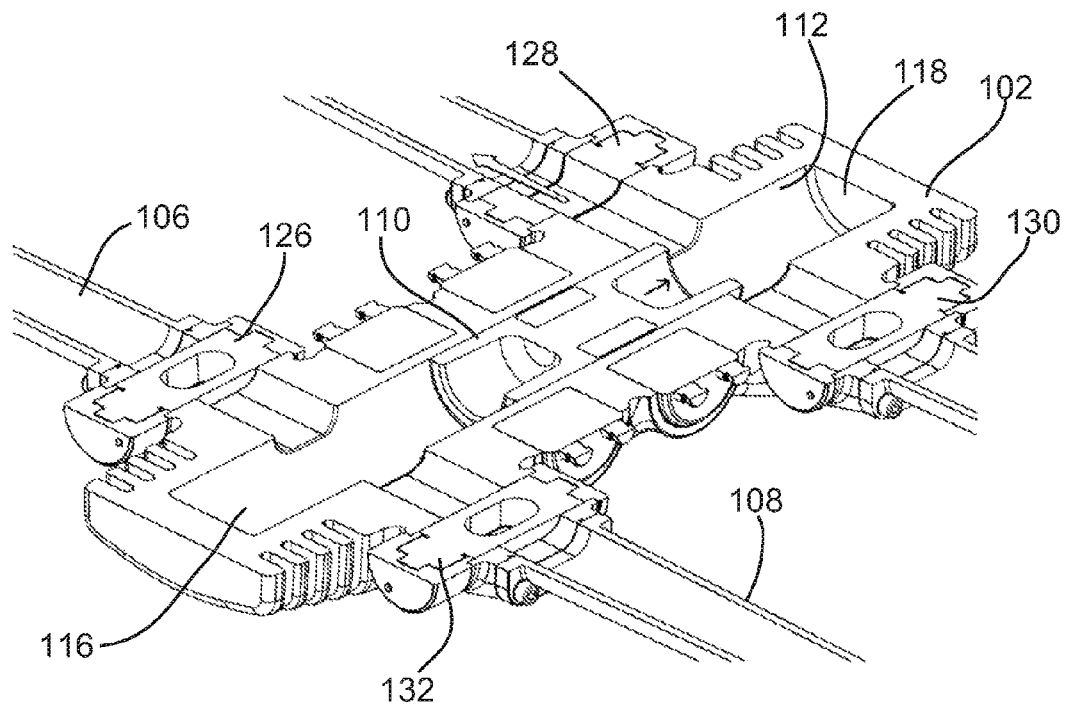
FIG. 3 is a partial cutaway perspective view of the energy transfer machine of FIG. 2 in a second phase.

As shown in FIG. 3, the kinetic energy of the moving piston is converted into increased pressure energy in the fluid in the cold end of the cylinder. The movement of the piston 110 pushes compressible fluid from the cold end 118 of the cylinder into the hot reservoir 106 through a cold fluid discharge valve 128. The valve 128 opens as the pressure in the cylinder end 118 approximately equals the pressure in the hot reservoir 106 to avoid throttling across the valve. When operating in a steady state condition, the mass of cold fluid that is pushed back into the hot reservoir 106 is approximately equal to the mass of hot fluid that was introduced into the cylinder 112 during the phase shown in FIG. 2. Compression of the cold fluid in the cold end 118 of the cylinder 112 requires less energy than is produced by the pressure and expansion of the hot fluid in the hot end 116 of the cylinder 112, which provides energy to overcomes parasitic loses in the system.

Figure 4:
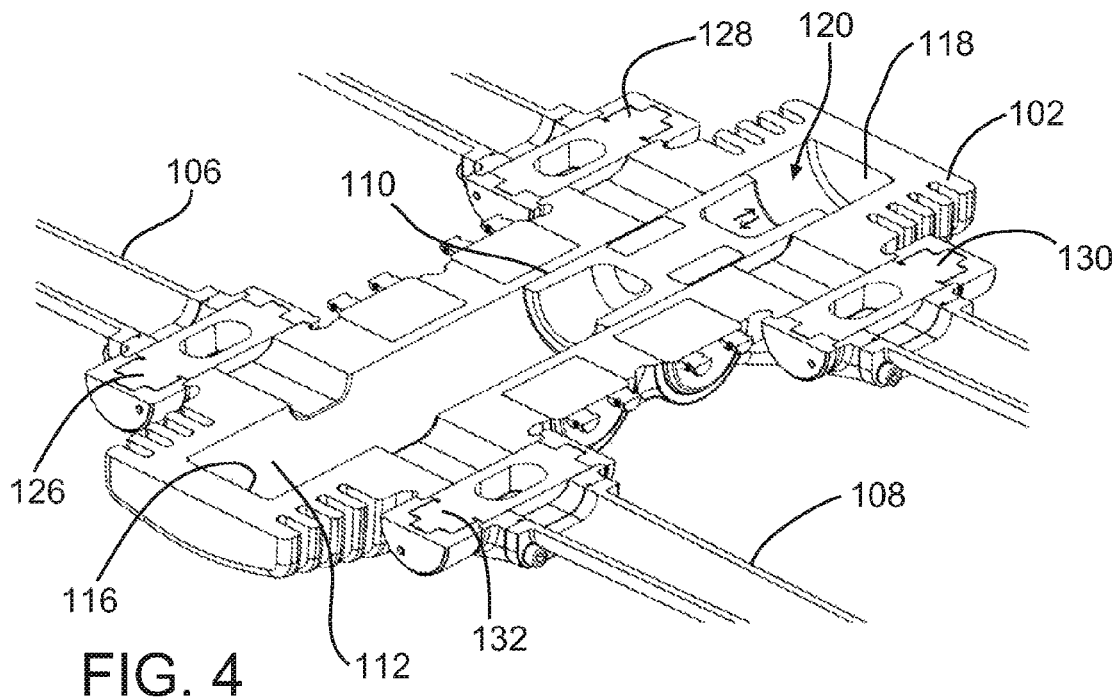
FIG. 4 is a partial cutaway perspective view of the energy transfer machine of FIG. 2 in a third phase.

As shown in FIG. 4, when the cold fluid discharge valve 128 is closed, the piston 110 will continue to move axially in the same direction until pressurization of the sealed fluid in the cold end 118 of the cylinder causes the piston 110 to stop and move in the opposite direction with conservation of a portion of the kinetic energy produced in the phase shown in FIG. 2. Pressurized fluid 120 created by the movement of the piston 110 causes the piston 110 to bounce back towards the hot end 116 of the cylinder 112.

Figure 5:
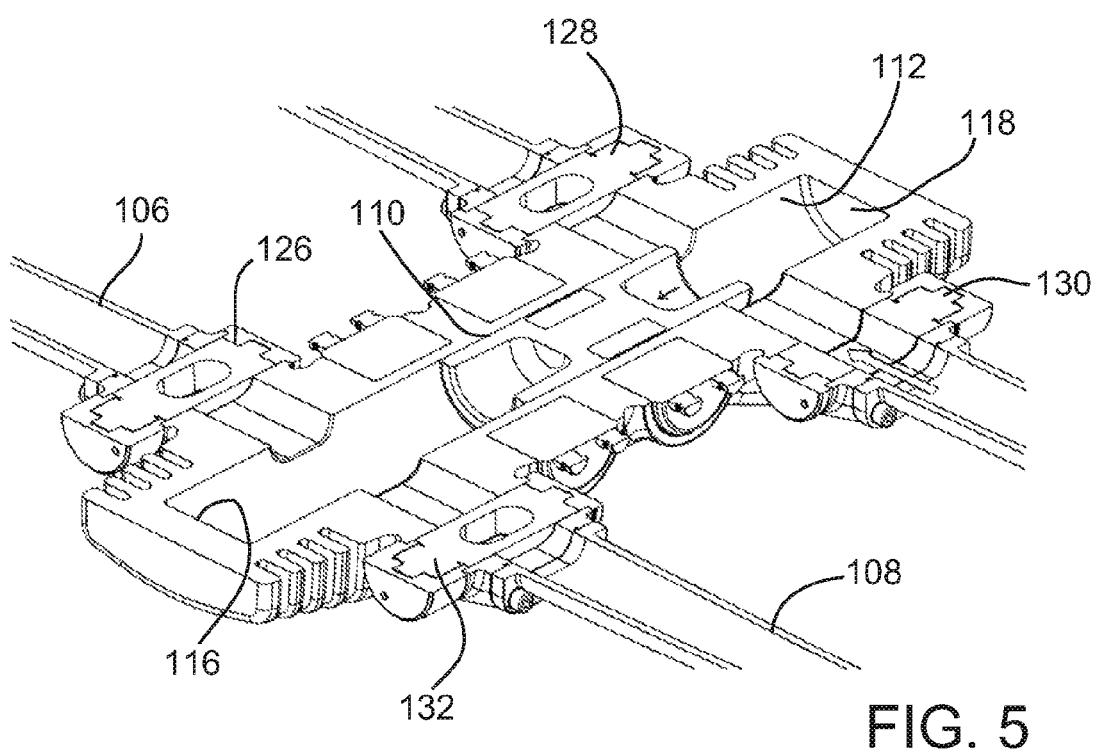
FIG. 5 is a partial cutaway perspective view of the energy transfer machine of FIG. 2 in a fourth phase.
Figure 6:
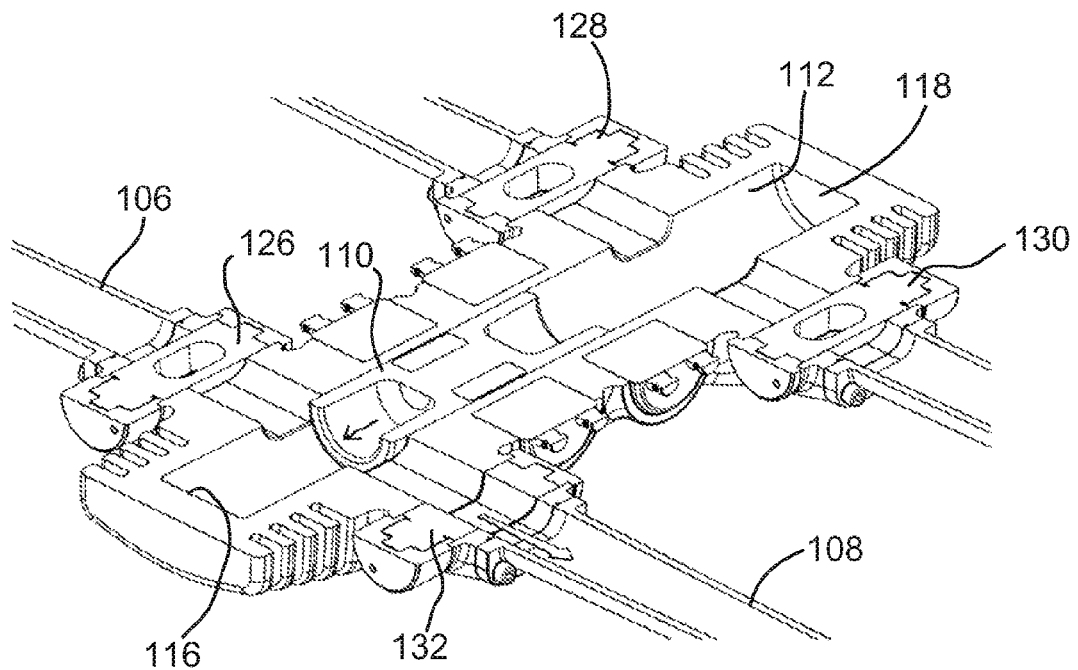
FIG. 6 is a partial cutaway perspective view of the energy transfer machine of FIG. 2 in a fifth phase.

As shown in FIG. 5, when the piston changes direction and begins a second stroke, and when the pressure in the cold end 118 of the cylinder 112 approximately equals the pressure in the cold reservoir 108, the cold fluid inlet valve 130 opens and allows cold fluid to be drawn in from the cold reservoir 108. When approximately the same mass of cold fluid as was expelled through the cold fluid discharge valve 128 is drawn into the cold end 118 of the cylinder, the cold fluid inlet valve 130 closes.

When the hot fluid inlet valve 126 closes after the conclusion of the phase shown in FIG. 2, the pressure in the hot end 116 of the cylinder 112 drops. As the piston 110 changes direction and begins the second stroke, which corresponds to the phase shown in FIG. 5, the pressure in the hot end 116 of the cylinder 112 increases. When the pressure in the hot end 116 of the cylinder 112 reaches approximately the same pressure as the cold reservoir 108, the hot fluid discharge valve 132 opens and discharges approximately the same mass of fluid that was originally introduced into the hot end 116 of the cylinder 112 during the phase shown in FIG. 2. This is an example of operation at a steady state.

Figure 7:
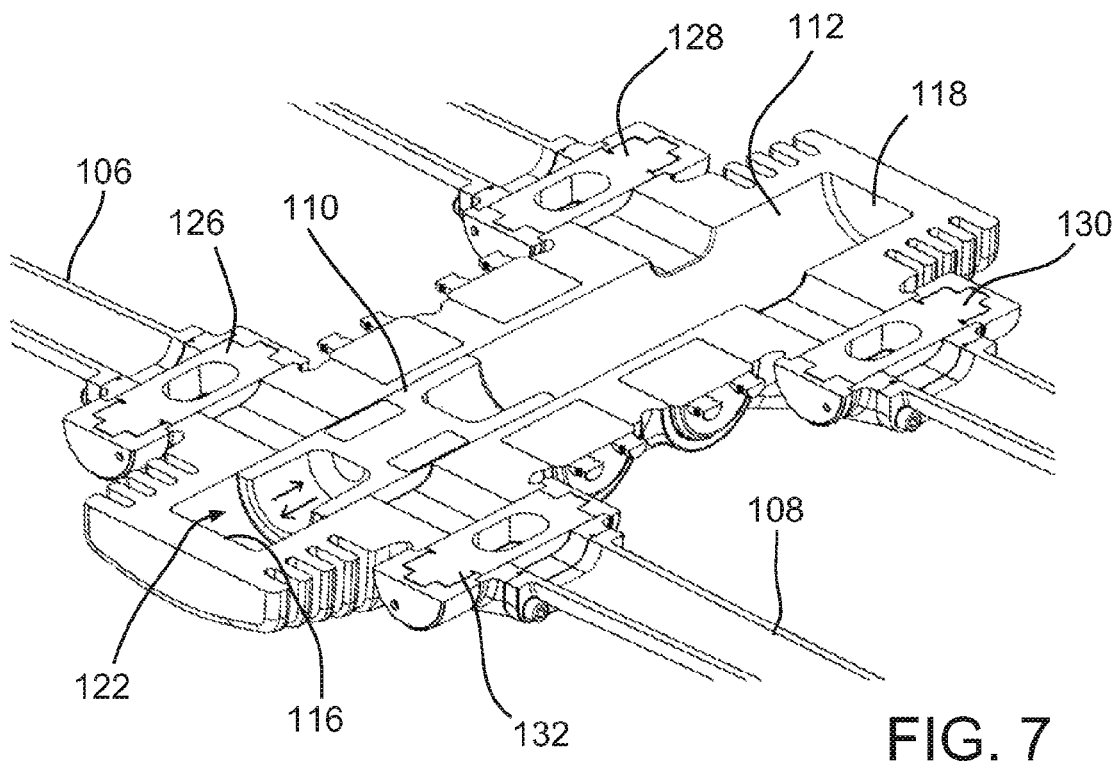
FIG. 7 is a partial cutaway perspective view of the energy transfer machine of FIG. 2 in a sixth phase.
Figure 8:
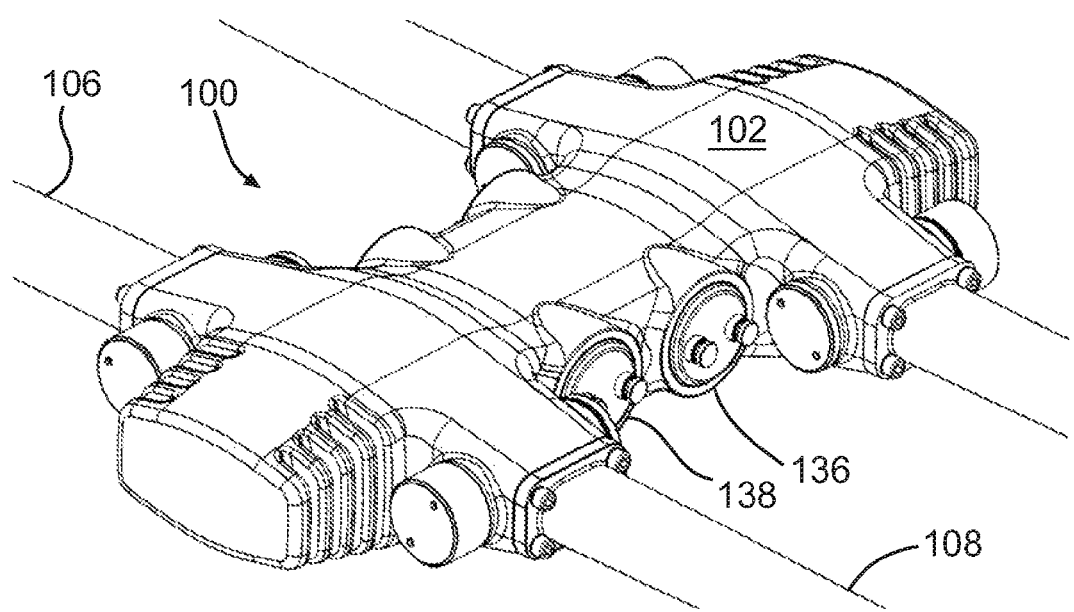
FIG. 8 is a partial perspective of the energy transfer machine of FIG. 1.
Figure 9:
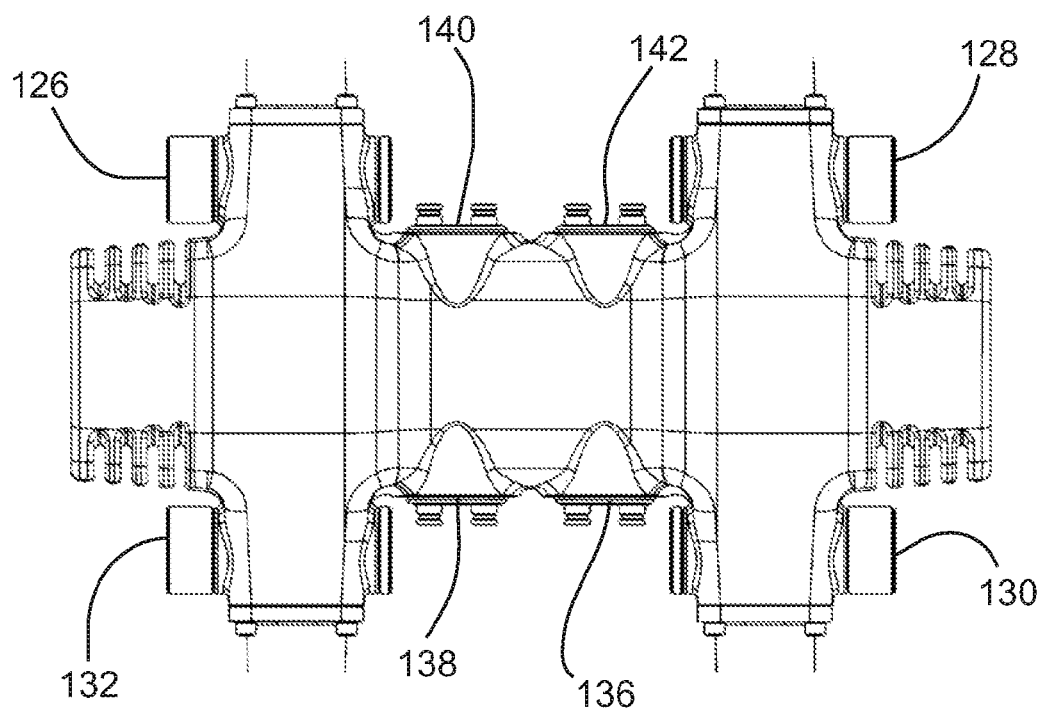
FIG. 9 is a partial top view of the energy transfer machine of FIG. 1.
Figure 10:
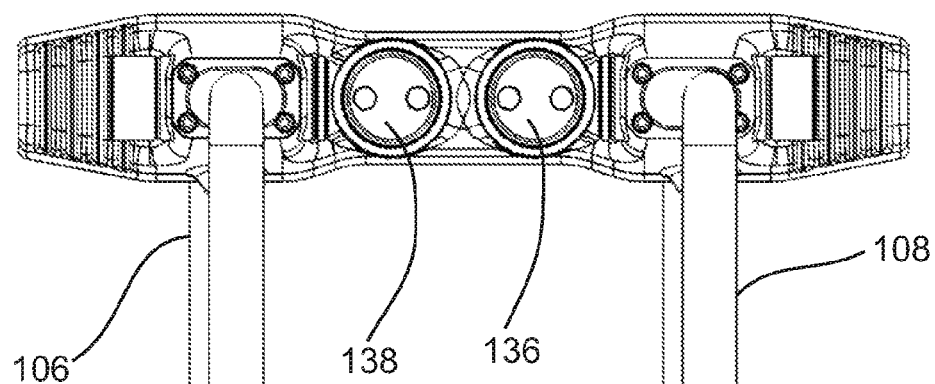
FIG. 10 is a partial side view of the energy transfer machine of FIG. 1.

As shown in FIG. 7, the hot fluid discharge valve 126 closes and pressure builds in the hot end 116 until the piston stops, changes directions and another cycle begins again starting with the phase shown in FIG. 2. Pressurized fluid 122 created by the movement of the piston 110 causes the piston 110 to bounce back towards the cold end 118 of the cylinder 112.

Figure 16:
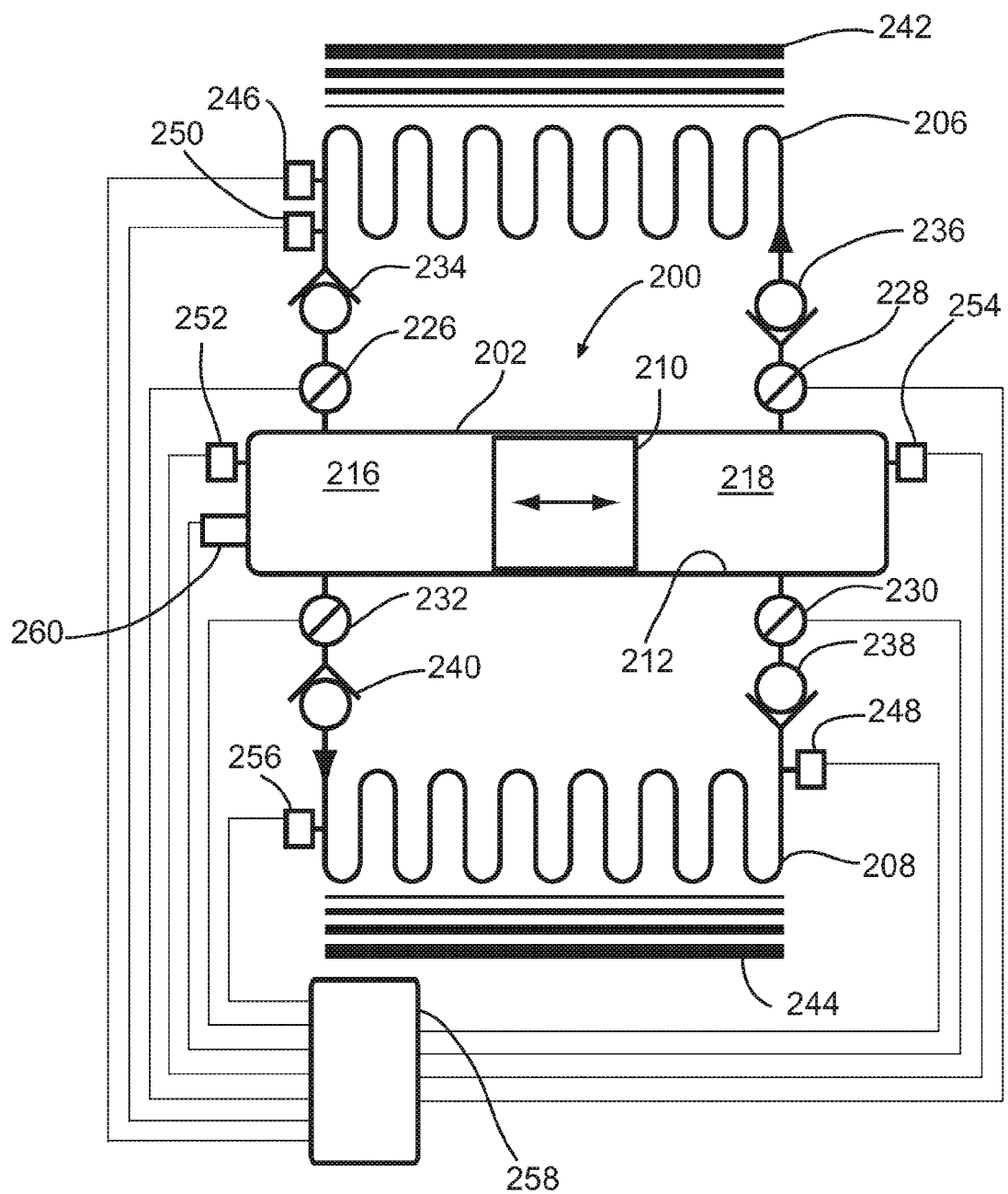
FIG. 16 is a schematic view of an energy transfer machine connected to a processor.

A computerized control system 258, such as shown in FIG. 16, may monitor the pressure in the hot and cold reservoirs 106, 108 and the axial position of the piston. The processor may determine the timing of the opening and closing of the valves and the amount of current to be drawn from the electromagnetic coils 136, 138, 140, 142 (FIG. 2). In some embodiments, the current drawn from the coils during any given cycle is approximately equal for both directions of piston movement. By using a low friction free piston and minimal or no external seals, parasitic losses are reduced, enabling power production at low temperature differentials. In some embodiments, the piston may achieve reciprocating speeds of 3600 cycles per minute to produce AC current at a preferred frequency of 60 Hz. In some embodiments, multiple rows of coils may be used to create more than one electrical pulse per stroke and allow lower engine speeds while maintaining 60 Hz AC output. Higher and lower speeds are also possible.

The temperature differential between the hot reservoir 106 and the cold reservoir 108 must be high enough to produce adequate pressure to develop enough kinetic energy to overcome parasitic loses in the system. The working fluid may be air or another compressible fluid such as, but not limited to helium, hydrogen or nitrogen. The mass of air may be measured by any means, including for example, by measurements from sensor inputs measuring pressure, temperature and change of volume via the piston position.

The cold reservoir 108 may be connected to a solid heat sink or may pass through ambient air or liquid that has lower temperature than the heat source. The valves 126, 128, 130, 132 may be mechanically or electrically actuated. For example, the valves may be mechanically controlled rotary valves which preferably spin at a constant speed (during steady state operation) and in a single direction or solenoid valves. In some embodiments the piston 110 may be controlled mechanically, for example with a crankshaft and connecting arms. The piston 110, may have a greater surface area at one end than the other but as shown in FIG. 2, preferably has the same diameter and surface area at both ends, which allows for a simple design. As conditions change during operation of the energy transfer machine the piston average axial position may vary. For example, during operation of the machine, the piston average position may migrate towards the hot end 116 of the cylinder 112 to affect the maximum volume and compression ratio at both ends of the cylinder. The piston 110 projects past the valves during the phases shown in FIGS. 4 and 7 so that the high pressure spikes when the piston 110 bounces against the hot and cold ends 116, 118 of the cylinder 112 is contained between the body 102 and the piston 110 and the additional pressure is not borne by the valves. A portion of each of the hot and cold ends 116, 118 of the cylinder 112 extend beyond the valves 126, 128, 130, 132. The cold end 118 may have a longer bounce length because the piston 110 stores kinetic energy for the return stroke. Insulation or a vacuum may be placed around the cylinder to conserve heat of the system, especially at the ends 116, 118 where temperature peaks during the bounce. The piston 110 may have expandable ends to more tightly seal during the bounces at each end of the cylinder 112.

As seen in FIGS. 2-7, the energy transfer machine 100 has a hot reservoir 106 and cold reservoir 108 that define a closed loop. Fluid has a unidirectional flow through the closed loop. The unidirectional flow allows heating and cooling to happen gradually and preferably over two or more cycles of the machine 100. The piston 110 has the same cross-sectional area on the opposed ends of the piston 110. Having ends of the piston 110 with the same cross-sectional area provides a simple design, with fewer components. Valve timing rather than piston area achieves variable displacement of fluid through the closed loop. Variable piston stroke allows the hot and cold cylinder ends 116, 118 to have different virtual displacements and therefore variable power outputs and requirements. The piston amplitude can be varied in response to different parameters such as heat gain and power out. For an electrical current output application, frequency and therefore AC current frequency may be maintained by modulating the piston oscillation amplitude. The energy transfer machine 100 may be operated at a wide variety of system pressures, piston displacements, temperature differentials including exceptionally low absolute and differential temperatures.

Various sensor arrangements may be used to determine the optimum airflow through each of the flow control valves 126, 128, 130, 132. One such sensor arrangement is shown in FIG. 16. Some energy may be lost in the pulsating of fluid in the heat exchangers. Pulse chambers may be used to reduce the energy lost. Piston speed and amplitude can be adjusted to optimize the pulse flow characteristics through the reservoir/heat exchangers.

If at an initial start up sequence there is insufficient pressure differential to create movement of the piston 110, then electrical current may be supplied to the electromagnetic coils 136, 138, 140, 142 to begin the piston oscillation. If the pressure differential in the system is sufficiently high, the engine may be started by opening and closing the valves 126, 128, 130, 132 in order to create movement of the piston 110. The electromagnetic coils 136, 138, 140, 142 may be used as linear motor coils until the piston 110 is oscillating at operating speed. During the startup phase, the piston amplitude, frequency and mass of airflow may be gradually increased from a stationary state. Electromagnetic coils 136, 138, 140, 142 may be used during the normal power cycle to increase or decrease the piston kinetic energy or to affect movement or position in order to change operational characteristics.

Electromagnetic coils 136, 138, 140, 142 may be used to magnetically suspend the piston 110. Suspending the piston 110 magnetically allows the magnetic coils 136, 138, 140, 142 and the magnets 124, 134 to work together as magnetic bearings. When the electromagnetic coils are used as magnetic bearings the electromagnetic coils may be arrayed around the cylinder 112. Electric coils for power generation may be located anywhere on the cylinder 112 including at the ends of the cylinder 112.

Figure 11:
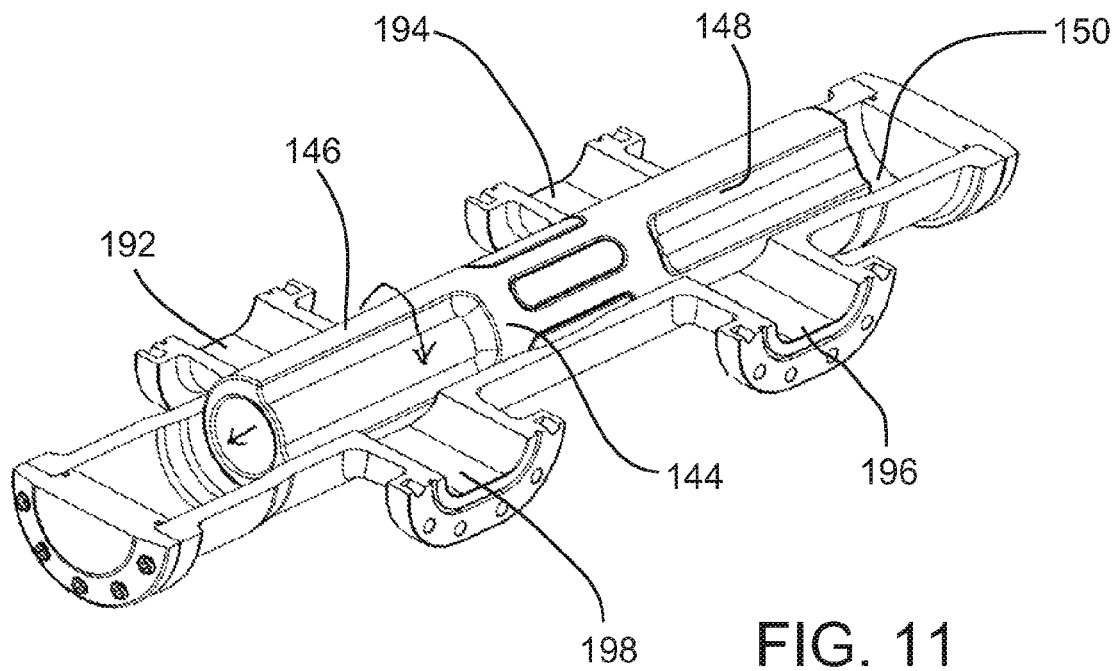
FIG. 11 is a partial cutaway perspective view of an energy transfer machine with a rotating piston.

FIG. 11 shows a partial view of an energy transfer machine with a spinning piston 144. The spinning piston has two flow conduits 146, 148 in the piston. The flow conduits 146, 148 function as a flow control mechanism similar to a solenoid valve. The piston 144 controls flow in and out of the cylinder 150 as the piston 144 spins on its axis while reciprocating. Inlet ports 192, 196 and discharge ports 194, 198 lie on the cylinder 150. The angular position of the piston 144 may be controlled by electromagnetic coils such as are shown in FIG. 2. The spinning piston 144 may replace one or more of the four valves shown in FIG. 2. The piston 144 may rotate in only one direction. The piston 144 may rotate at a rate of less than one rotation per cycle, equal to one rotation per cycle or more than one rotation per cycle, depending on the configuration of the flow conduits 146, 148. The spinning piston 144 may be used to store kinetic energy which may be used to generate electricity by rotationally decelerating the piston one or more times per cycle. The current produced by the spinning of the piston 144 may be used to modify the output voltage, for example, to more accurately match the preferred AC waveform. The generator coils 136, 138, 140, 142 (FIG. 2) may be used to rotationally accelerate and decelerate the piston. Rotational acceleration draws current, while rotational deceleration produces current. Variation of the acceleration and deceleration of the spinning piston 144 may adjust the valve opening and closing times.

At the inlet ports 192, 196, the spinning piston valve 144 will open prematurely and a check valve (not shown) will stay closed until the pressure in the cylinder 150 drops slightly below the heat exchanger pressure at the respective inlet ports 192, 196. The spinning piston valve 144 will then close at the appropriate time as determined, for example, by a control system. For the discharge ports 194, 198, the spinning piston valve 144 will open prematurely and check valves (not shown) will stay closed until the pressure in the cylinder rises slightly above the heat exchanger pressure at the respective discharge ports 194, 198. The spinning piston valve 144 will then close at the appropriate time as determined, for example, by a control system. The spinning piston valve 144 is designed with an extended open-dwell time to allow this. The spinning piston 144 may be designed to open and close at the precise time for a steady state system. When used in combination with check valves the spinning piston 144 allows efficient operation in transient state operation.

Figure 12:
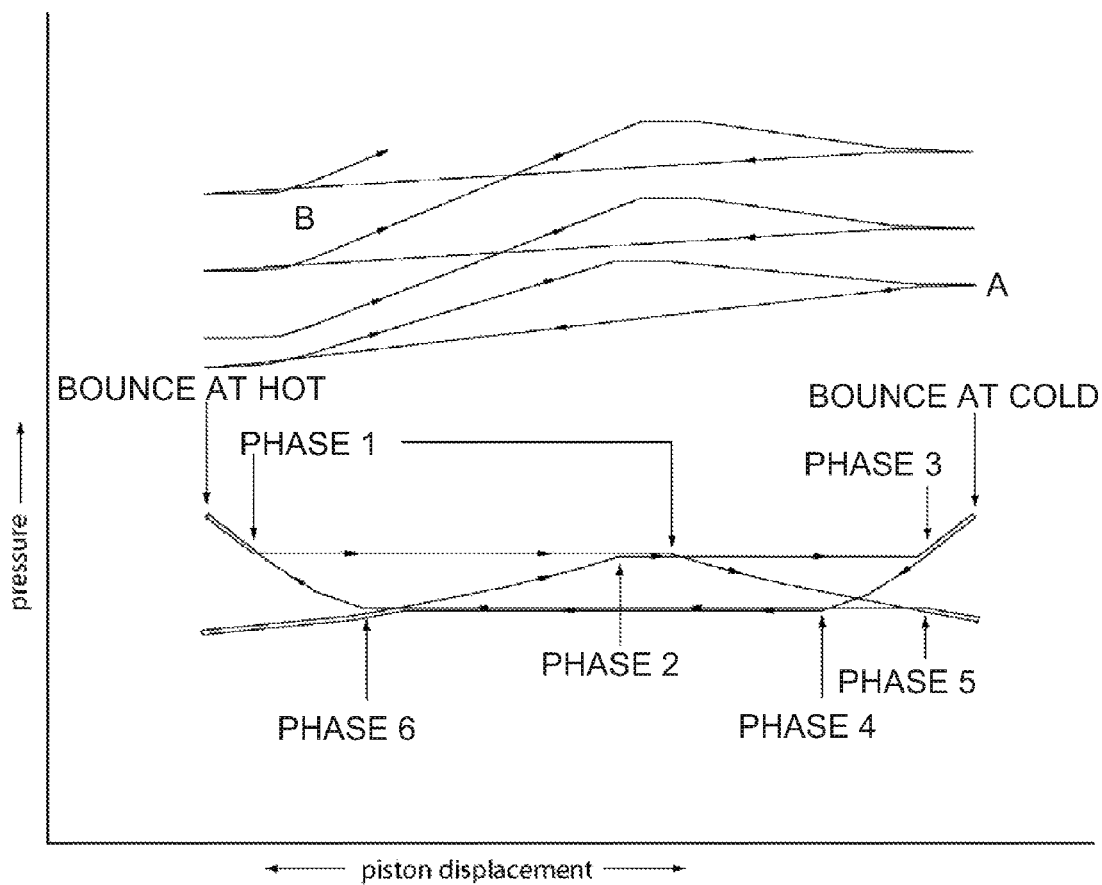
FIG. 12 is a graph schematically representing the pressure associated with the piston displacement of an energy transfer machine during different phases of the piston stroke.

FIG. 12 is a graph representing the pressure and piston displacement of the energy transfer machine 100 shown in FIGS. 1-10 during the various phases of piston movement. In Phase 1 the hot fluid inlet valve 126 (FIG. 2) opens when the hot end 116 of the cylinder 112 has pressure equal with the hot reservoir 106 pressure and closes when a specified mass of hot air has been introduced. During phase 2, which corresponds to the phase shown in FIG. 3, the cold fluid discharge valve 128 (FIG. 3) opens when the cold end 118 pressure is equal to the hot reservoir 106 pressure. In phase 3, which corresponds to the phase shown in FIG. 4, the cold fluid discharge valve 128 (FIG. 5) closes when the specified mass of cold air is discharged into the hot reservoir 106. Following phase 3, the piston bounces at the cold end 118 of the cylinder 112. In phase 5, the hot fluid discharged valve 132 (FIG. 6) opens when the hot end 116 pressure is approximately equal with the cold reservoir 108. As seen in this graph, the phases 1-6 may not occur in sequential order and some phases may occur simultaneously. In this case, phase 5 occurs before phase 4 and after phase 4 begins both phase 4 and phase 5 occur at the same time. In phase 4, the cold fluid inlet valve 130 (FIG. 5) opens when the cold end 118 pressure is equal with the cold reservoir 108 pressure. In phase 6, the hot fluid discharge valve 132 (FIG. 7) closes when the specified mass of hot air has been discharged to the cold reservoir 108. The cold fluid inlet valve closes 130 when the specified mass of cold air has been drawn into the cylinder 112. Following phase 6 the cycle returns to the beginning of phase 1 after the piston pressure bounces at the hot end 116 of the cylinder 112. In the graph in FIG. 12 two distinct pressure curves are shown. The curve that begins with what is denoted Phase 1 corresponds to the pressure at the hot end 116 of the cylinder 112. The second curve that is shown corresponds to the pressure at the cold end 118 of the cylinder 112.

Pressure in the hot heat exchanger 106 is higher, in operation, than the pressure in the cold heat exchanger 108 as indicated in FIG. 12. Movement of a movable element of a pressure-displacement coupled interface pressurizes air from the cold end of the cylinder into the hot reservoir (through a cold air discharge valve or some other flow controlling means) so higher pressure is maintained in the hot reservoir as compared to the cold reservoir. In one embodiment, this compression is carried out with one end of a free piston, but other devices such as electroactive materials may be used. The mass of cold air which is ported back to the hot reservoir is approximately equal to the mass of hot air which was introduced into the cylinder at the hot end of the cylinder in phase 1. Compression of the cold air in the cold end of the cylinder requires less power than is produced by the pressure and expansion of the hot air in the hot end of the cylinder. This provides energy to overcome parasitic losses in the system and to do work.

The curve above the graph that is denoted by the character A represents the kinetic energy of the piston during electrical power generation. The curve above the graph that is denoted by the character B represents the kinetic energy of the piston under no load.

Figure 13:
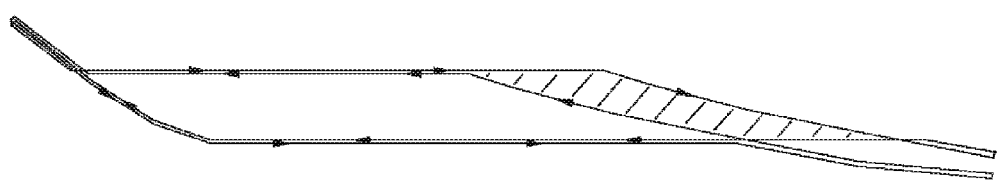
FIG. 13 is a graph schematically representing the difference in pressure and piston displacement for different phases of the piston stroke.

FIG. 13 shows a comparison of the hot and cold curves that show the energy available to perform external work. The shaded area represents the energy gained through the introduction of hot fluid into the system that is available to perform work. The two curves in the graph represent the two curves shown in FIG. 12 in which the two curves are aligned so that the "Bounce at Hot" portion of the hot curve aligns with the "Bounce at Cold" portion of the cold curve.

Figure 14:
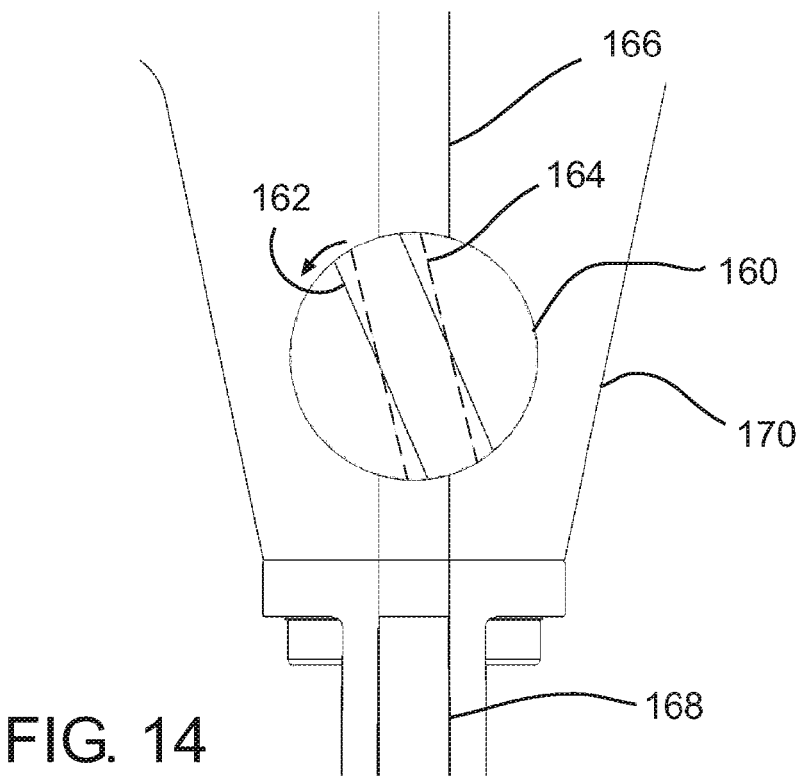
FIG. 14 is a top section view of an overlapping valve design.

FIG. 14 shows a simplified view of a rotary valve 160 for use with an energy transfer machine, such as energy transfer machine 100 shown in FIG. 2. Rotary valves consume less energy than some other valve systems. There are two rotating valves 162, 164 that open and close at a similar time, but are phase shifted so that the first rotating valve 162 opens before the second rotating valve 164 and the second valve 164 closes after the first rotating valve 162. The valve connects one of the hot or cold reservoirs 168 with the cylinder 112 (FIG. 2) through a fluid passageway 166 within a housing 170. The overlapping valves 162, 164 may be in the same plenum or in separate plenums feeding into or out of the same port. The valve 160 spins counterclockwise as seen from the top view shown in FIG. 14. The valve 160 opens twice during a single rotation meaning that the valve 160 opens and closes twice as fast, reducing turbulence and throttling, which may otherwise occur during valve operation.

In other embodiments, a single rotary valve may be used for each port. Fluid may flow through the valves axially, radially or both axially and radially. The valve can be accelerated and decelerated to affect the opening and closing time of the port. The deceleration may be used to charge a storage device such as a capacitor, which increases the efficiency of this type of valve.

Figure 15:
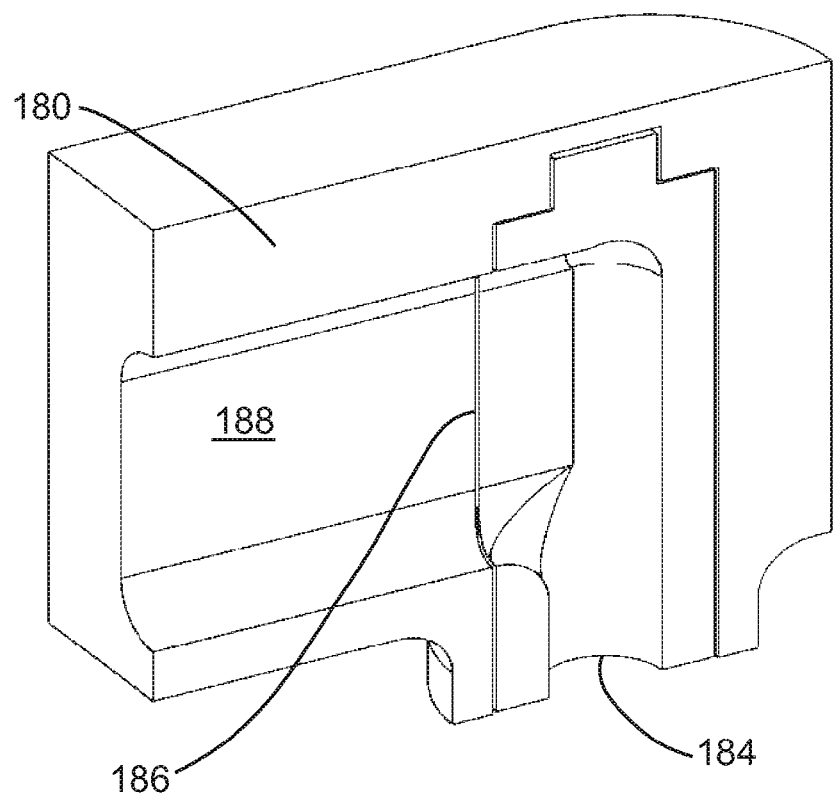
FIG. 15 is a partial cutaway perspective view of an axial-radial valve.

FIG. 15 shows a rotating radial sleeve valve 180. Compressible fluid passes through the valve through the opening 184 and through the valve when the valve opening 186 is aligned with the fluid passageway 188 as shown in FIG. 15.

Timing of the valves may be achieved by combining an active valve, for example a spinning valve, to precisely time the closing of the valve combination and using an in-line check valve to control the opening of the valve combination. For example, the spinning valve can be constructed to allow the precise timing of the valve system closing of the ports. The spinning valve opening may be designed to always open before the gas needs to flow by rotating the valve at a constant speed but using a valve with an increased rotating valve port dwell angle so that the valve pre-opens the stationary flow port. A passive check valve is then used in series before or after the rotating valve to allow flow when A) the active valve is open and B) the pressure differential across the check valve is in the direction which would cause the check valve to open.

FIG. 16 shows a schematic drawing of an energy transfer machine 200. A piston 210 is set within a cylinder 212 in a body 202. The cylinder 212 has a hot end 216 and a cold end 218. A first heat exchanger 206 forms an energy transfer circuit with the piston 210. A second heat exchanger 208 forms an energy transfer circuit with the piston 210. Together the first and second heat exchangers 206 and 208 form a closed loop. The first heat exchanger 206 receives thermal energy from a heat source 242. The second heat exchanger 208 dissipates thermal energy into a heat sink 244. A hot fluid inlet valve 226 and a check valve 234 separate the hot end 216 of the cylinder 212 with the first heat exchanger 206. The check valve 234 prevents fluid from flowing from the hot end 216 of the cylinder 212 into the first heat exchanger 206 when the hot fluid inlet valve 226 is open. A cold fluid discharge valve 228 and a check valve 236 separate the cold end 218 of the cylinder 212 with the first heat exchanger 206. The check valve 236 prevents fluid from flowing from the first heat exchanger 206 into the cold end 218 of the cylinder 212 when the cold fluid discharge valve 228 is open. Similarly, a cold fluid inlet valve 230 and a hot fluid discharge valve 232 connect the cylinder 112 and the second heat exchanger 208. Check valves 238, 240 operate to prevent fluid from flowing into and out of the second heat exchanger 208, respectively, under the same principles as check valves 234, 236. The operation of the valves 226, 228, 230, 232 is the same as the operation of the valves 126, 128, 130, 132 described in the embodiment shown in FIGS. 2-7.

Temperature sensor 246 and pressure sensor 250 detect the temperature and the pressure of the fluid in the first heat exchanger 206 prior to being input into the hot end 216 of the cylinder 212. Temperature sensor 248 detects the temperature of the fluid in the second heat exchanger 208 prior to being input into the cold end 218 of the cylinder 212. Pressure sensor 256 detects the pressure of the fluid in the second heat exchanger 208 after being discharged from the hot end 216 of the cylinder 212. Pressure sensor 252 detects the pressure in the hot end 216 of the cylinder 212. Pressure sensor 254 detects the pressure in the cold end 218 of the cylinder 212. A piston position sensor 260 detects the position of the piston 210 in the cylinder 212. A processor 258 is connected to each of the pressure sensors 250, 252, 254, 256, the temperature sensors 246, 248, the piston position sensor 260 and the valves 226, 228, 230 and 232. The processor 258 opens and closes the valves 226, 228, 230, 232 according to the readings of the various sensors, for example, implementing the method of opening and closing valves described in phases 1-6 described in the embodiments shown in FIGS. 2-7. The processor 258 may be configured to seek the ideal efficiency by oscillating the individual valve timing in order to find the highest output.

FIG. 17 shows a simplified schematic drawing of the energy transfer machine 200 of the embodiment of FIG. 16 with mechanical bounce springs 270, 272 on opposed sides of cylinder 212 to assist the pressure bounce of the piston 210 during phases that correspond to the phases 3 and 6 shown in FIG. 4 and FIG. 7 of the energy transfer machine 100. The mechanical bounce springs complement the pressure bounce created by compression of the compressible fluid against the opposed ends of the cylinder 212 caused by the motion of the piston 210.

FIG. 18 shows a simplified schematic drawing of the energy transfer machine 200 of FIG. 16 with opposing magnetic bounce springs 286, 288 on opposed sides of the cylinder 212 that correspond to piston magnetic bounce springs 282, 284 on opposed sides of a piston 280. The operation of the magnetic bounce springs is equivalent to the mechanical bounce springs in FIG. 17.

Figure 20:
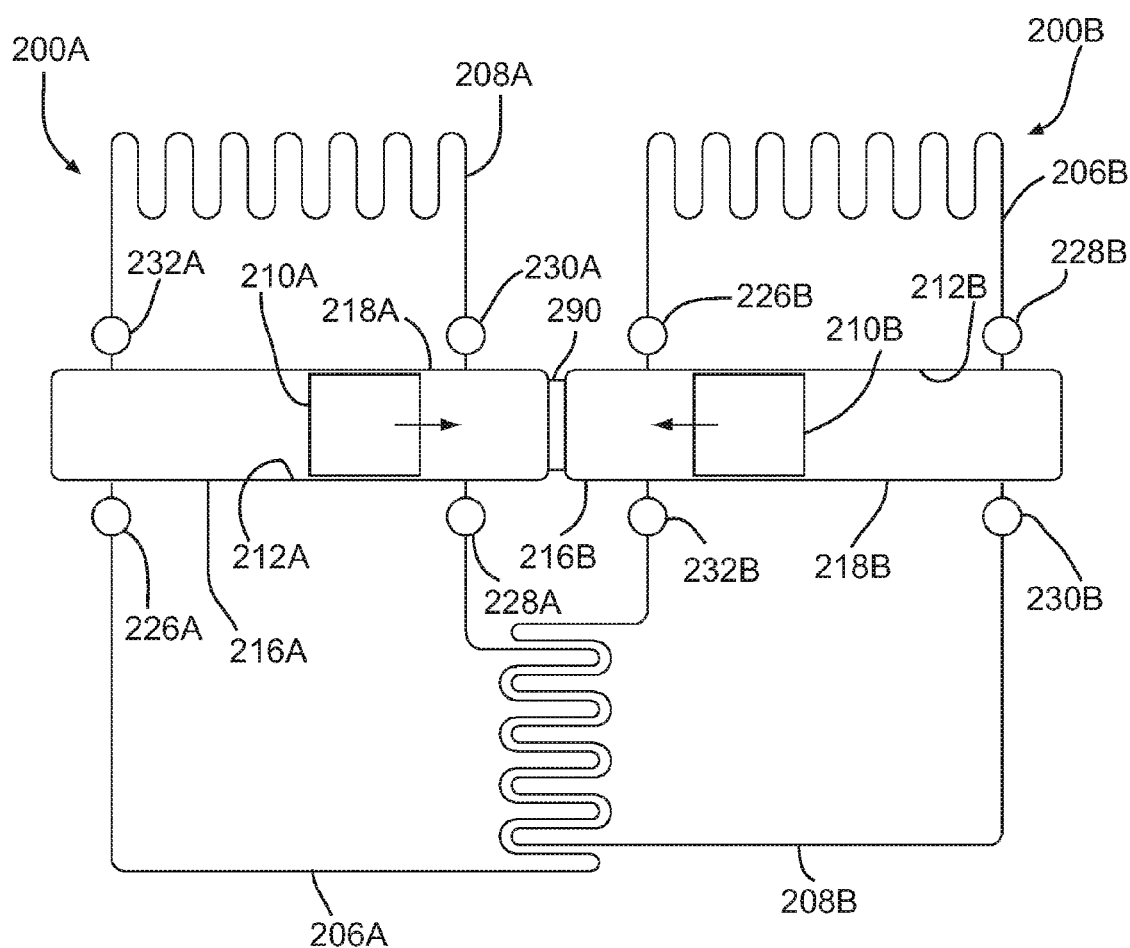
FIG. 20 is a schematic view of an energy transfer machine with two opposed pistons connected in series.

FIGS. 19 and 20 show combinations of two energy transfer machines 200 operating with two pistons 210. Opposing movement of the pistons 210 may reduce or even eliminate vibration. In FIG. 19 the two energy transfer machines 200 are connected by a connector 290 and operate in parallel with respect to heat energy flow. The valves 226, 228, 230, 232 are arranged on the two energy transfer machines 200 so that corresponding phases of the respective energy transfer machines occur almost simultaneously and occur along the same axis but in opposite directions, thereby canceling the vibratory motion of the pistons 210. In FIG. 20 the two energy transfer machines 200A, 200B operate in series with respect to heat energy flow for more efficient use of heat energy Fluid that is discharged through hot fluid discharge valve 232B from the hot end 216B of cylinder 212B heats fluid that is discharged through the cold fluid discharge valve 228A from the cold end 218A of cylinder 212A. The energy transfer machines 200A, 200B may also operate as a cooling machine, by causing movement of the pistons 210A and 210B in order to circulate fluid to provide cooling. In the operation of the cooling embodiment, the direction of heat energy flow is reversed and power input is into the piston movement rather than drawn from it. In this case, the hot reservoirs are is used to dissipate the elevated temperatures of the elevated pressure working fluid. The cold reservoirs use the reduced heat energy fluid to draw heat energy from the medium or heat exchanger which is being cooled. in FIG. 20 the cold reservoir 208B is used to cool the hot reservoir 206A of energy transfer machine 200A to achieve more effective cooling of the cold reservoir 208A. The operation of the cooling embodiment of the energy transfer machine 200 is discussed in more detail in FIG. 22.

Figure 21:
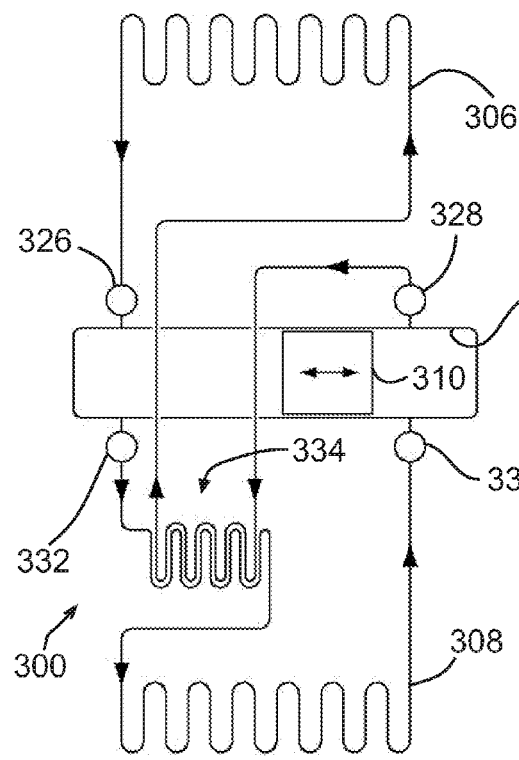
FIG. 21 is a schematic view of an energy transfer machine with a regenerator.
Figure 22:
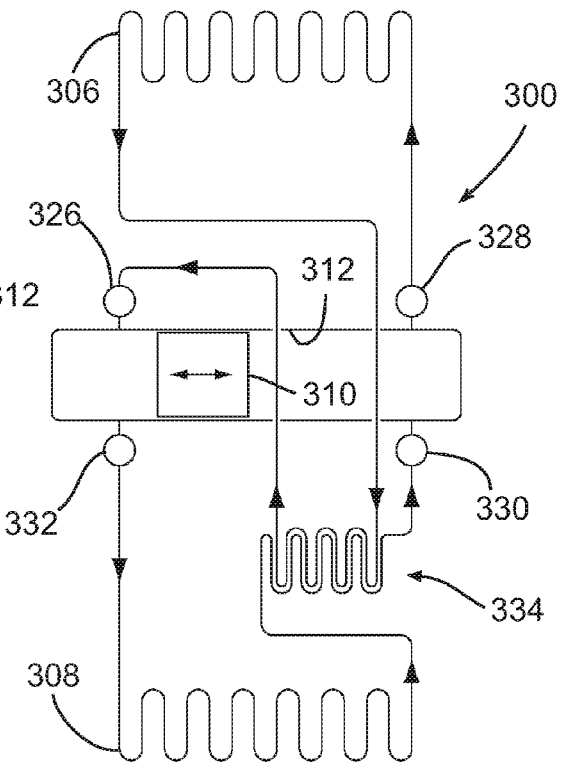
FIG. 22 is a schematic view of an energy transfer machine in a configuration for cooling applications.

In FIGS. 21 and 22 an energy transfer machine 300 is shown with a regenerator 334. FIG. 21 shows the energy transfer machine configured for power generation from heat differential. FIG. 22 shows an energy transfer machine with the same structure as FIG. 21 configured for cooling applications, in which the flow of heat energy to and from the reservoirs is opposite. A piston 310 moves axially within a cylinder 312. Flow control valves 326, 328, 330, 332 control the flow of fluid through the cylinder 312. In FIG. 21, a first heat exchanger 306 collects heat from an exterior heat source 242 (FIG. 16). Heated fluid passes through the first heat exchanger 306 and into the cylinder 312 through a hot fluid inlet valve 326. The heated fluid eventually passes through hot fluid discharge port 332 into a second heat exchanger 308 where the heated fluid dissipates heat through the first heat exchanger 306 to a heat sink 244 (FIG. 16). The section 334 where energy is transferred between the first and second heat exchangers 306, 308 is referred to as a regenerator. After passing the regenerator 334, fluid discharged from hot fluid discharge port 332 dissipates heat into an exterior heat sink 244 (FIG. 16). The cooled fluid then enters the cylinder 312 through a cold fluid input port 330 where the fluid is eventually discharged through a cold fluid discharge port 328 into the first heat exchanger 306. The fluid then passes again through the regenerator 334 where the fluid in the second heat exchanger 308 heats the discharged fluid from the cold fluid discharge port 328 and the process repeats. The regenerator 334 recovers waste heat from the first portion of the system and increases overall efficiency.

The operation of the energy transfer machine 300 in FIG. 22 in operation in the cooling operations is similar, except that the heat energy transfers to and from the heat exchangers/reservoirs in the opposite direction. Movement of the piston is used to create motion of the fluid through the closed loop. The energy transfer machine cools the medium that is thermally connected to the second exchanger 308. The regenerator in FIG. 22 "pre-cools" the working fluid before it is expanded in the hot end of the cylinder to achieve a significant benefit of lower temperatures in the cold reservoir/exchanger 308. If the device is operated as a cooling machine by powering the piston and if the regenerator is located after the expansion phase at the hot end of the cylinder as in FIG. 21, a significant benefit will be more efficient operation of the entire system.

Figure 23:
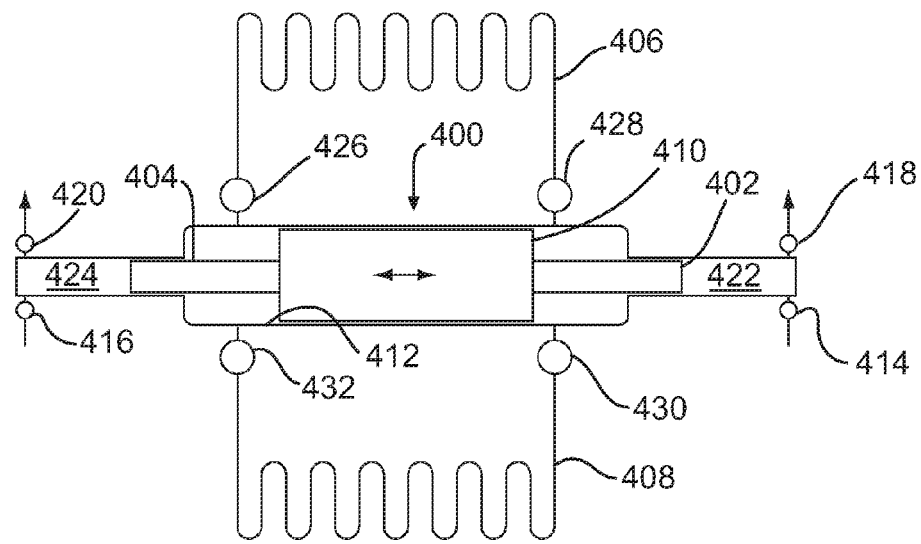
FIG. 23 is a schematic view of an energy transfer machine configured to provide a compressor output.

FIG. 23 shows an energy transfer machine 400 with a pump output. A piston 410 having two opposed drive shafts 402, 404 reciprocates within a cylinder 412. Valves 426, 428, 430, 432 regulate fluid flowing through a hot reservoir 406 and a cold reservoir 408. The reciprocating movement of the piston 410 draws a fluid through one-way valves 414, 416 into chambers 422, 424 on alternating strokes of the piston 410 and drives the fluid out through one-way valves 418, 420 on the opposed alternating strokes of the piston 410.

Figures 24, 25:
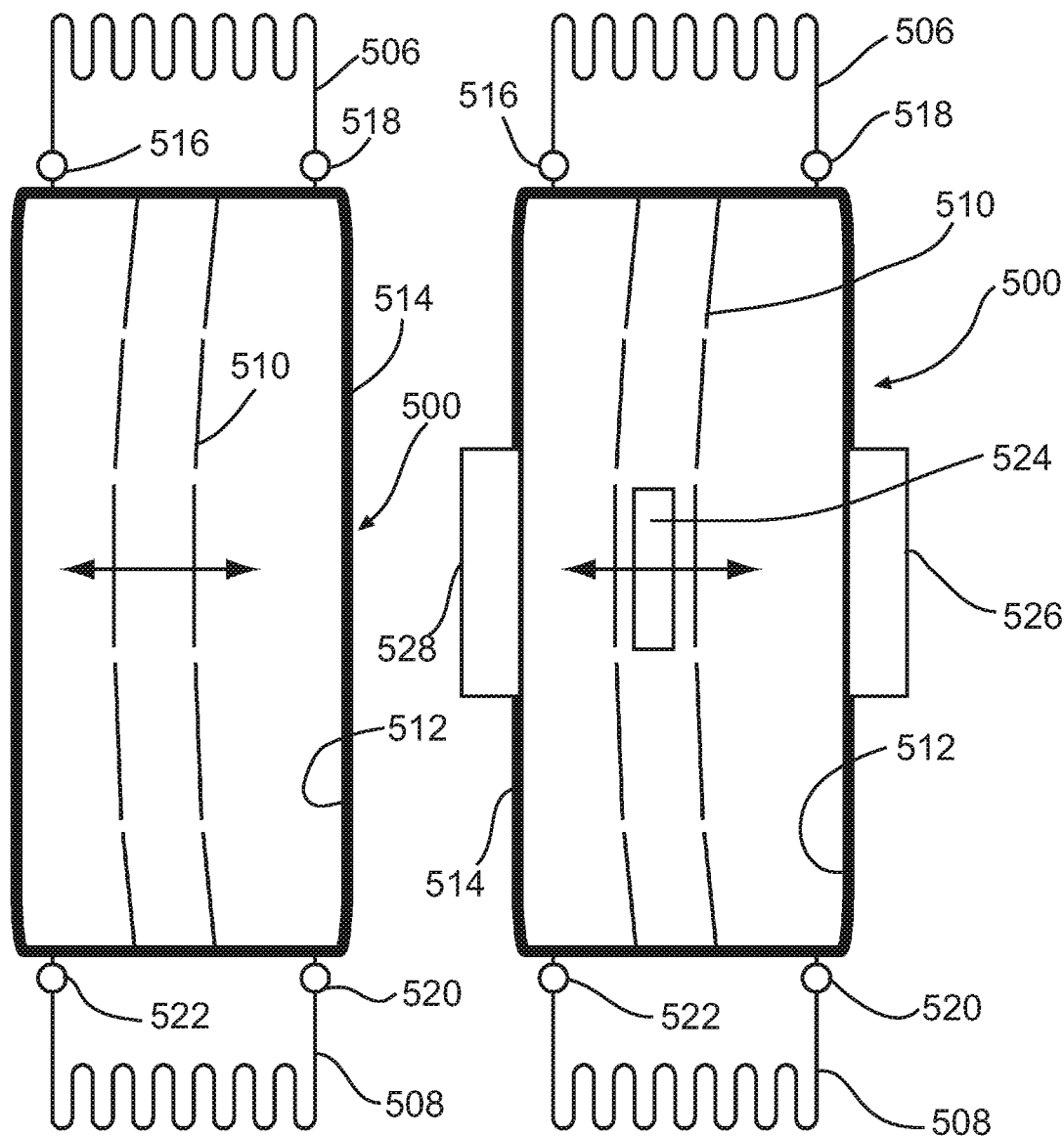
FIG. 24 is a schematic view of an energy transfer machine with an electrically energized displacer.
FIG. 25 is a schematic view of an energy transfer machine with electromagnetic coils.

FIGS. 24 and 25 show an energy transfer machine 500 with an electrically energized deformable diaphragm 510, which may be for example a electrically active material displacer such as a piezo ceramic or a electroactive polymer. piston. Electroactive materials are materials that change shape as a result of electrical input. For example, electroactive polymers or EAPs are polymers whose shape is modified when a voltage is applied to them. In various embodiments, EAPs may be used as inlet and discharge valves, actuators used within the pressure-displacement coupled interface and pressure sensors. Electroactive materials may comprise for example dielectric EAPs and ionic EAPs.

The deformable diaphragm 510 lies in a chamber 512 in body 514. Flow control valves 516, 518, 520, 522 supply fluid from a hot reservoir 506 and a cold reservoir 508 in a similar manner to flow control valves 126, 128, 130, 132 described in the embodiments shown in FIGS. 2-7. In FIG. 25, a magnet or ferrous element 524 is attached to a flexible diaphragm 510. The magnet 524 interacts with magnetic coils 526, 528 on opposed sides of the body 514 to produce energy in a power generation configuration of the energy transfer machine 500. In a basic cooling configuration the magnet or ferrous material 524 is energized by interaction with the electromagnetic coils 526, 528. The embodiment of FIGS. 24 and 25 may be used for micro cryocooling. Movement of the diaphragm 510 may change the pressure of the entire chamber, or may create pressure waves, which, with precise valve timing, may generate elevated or decreased pressure in and out of the chamber.

Figure 26:
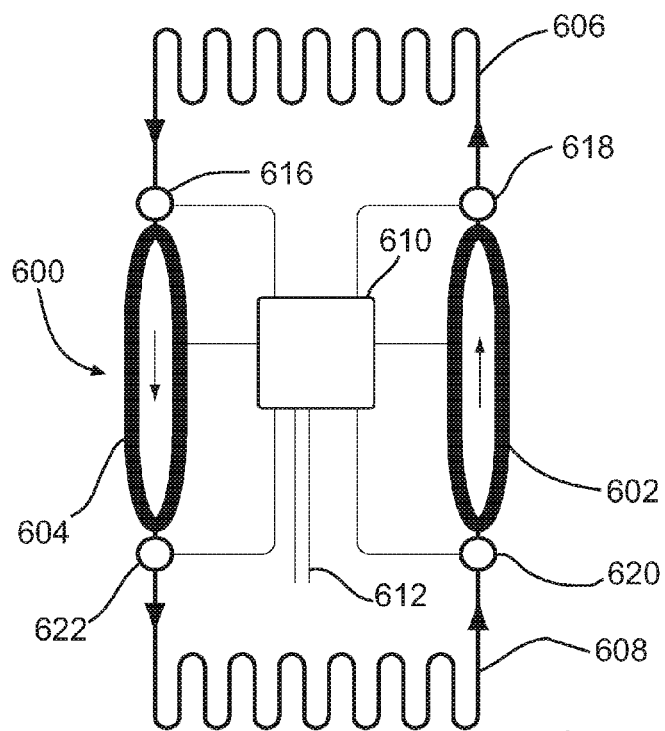
FIG. 26 is a schematic view of an energy transfer machine with compression chambers.

FIG. 26 shows an energy transfer machine 600 with compression chamber 602, and expansion chamber 604. Flow control valves 616, 618, 620, 622 control fluid flow through the closed loop defined by a hot reservoir 606 and a cold reservoir 608. A processor 610 controls the opening and closing of the valves 616, 618, 620, 622 which are timed in a similar manner as the valves 126, 128, 130, 132 in the embodiments shown in FIGS. 2-7. The processor 610 is shown connected to an electrical supply or output 612. The energy transfer machine 600 may be heated by a heat source such as a computer chip. Heat from the computer chip pressurizes the hot reservoir 606 and causes expansion chamber 604 to expand. An electrical current produced by the expansion of the expansion chamber 604, possibly in addition to energy provided by electric supply 612, is used to contract the compression chamber 604. The energy transfer machine 600 may be used for power generation or may operate as a cooling device or as a self energizing efficient cooling device. The volume of expansion chambers 602 and 604 may be equal or different. In some embodiments the electrical supply 612 or the electrical output 614 may be omitted. Also, the electrical energy produced by the expansion chamber 604 does not necessarily have to be used to energize the compression chamber 602.

Figure 27:
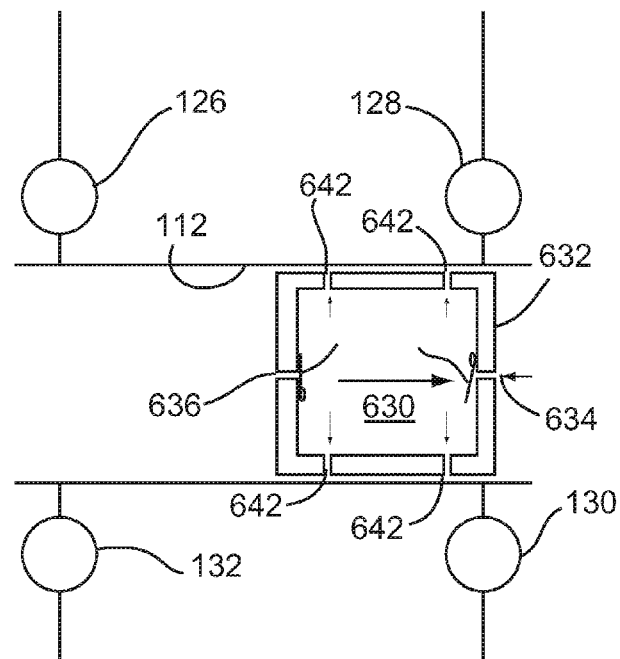
FIG. 27 is a schematic view of a piston for an energy transfer machine with air bearings.

FIG. 27 shows a piston 632 with air bearings 642 in the cylinder 112 (FIG. 2). The friction of the piston 632 against the cylinder is reduced using air bearings 642. An air chamber 630 lies within the piston 632, which has check valves 634, 636 at opposed ends of the piston 632. When the piston bounces from the opposed ends 116, 118 (FIG. 4) of the cylinder 112 the pressure inside the air chamber 630 is increased to nearly the maximum bounce pressure. The pressurized air is then used to feed air bearings 642 arrayed around the surface of the piston 632.

Figure 28:
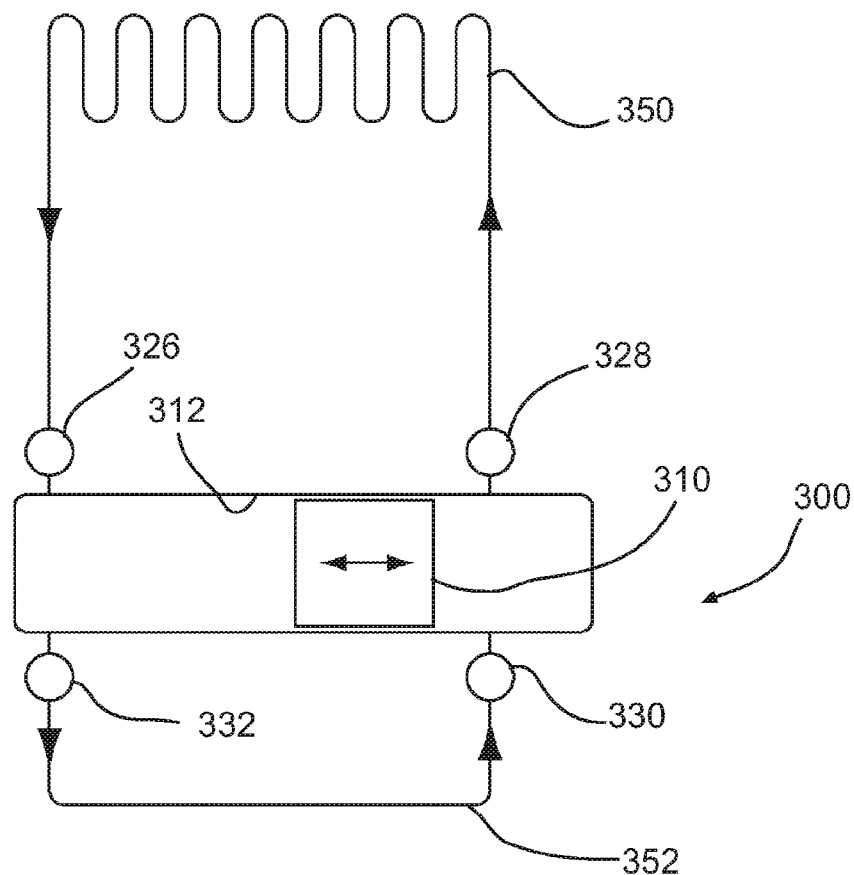
FIG. 28 is a schematic view of an energy transfer machine with a heat exchanger on only one side.

FIG. 28 shows the energy transfer machine 300 with a heat exchanger 350 on only one side of the closed loop around the energy transfer machine 300. The fluid control valves 330, 332 are connected directly by tubing 352 to minimize heat exchange through tubing 352. In some embodiments, the energy transfer machine 300 may have a less effective heat exchanger on one side of energy transfer machine 300, or may have a heat exchanger on only one side of the energy transfer machine 300.

Figure 29:
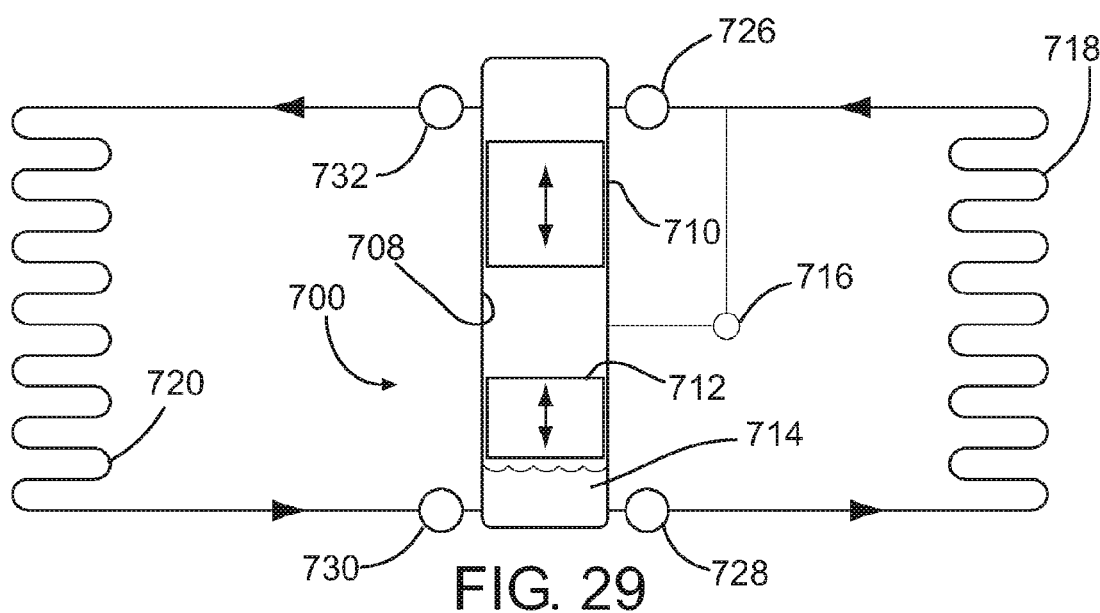
FIG. 29 is a schematic view of an energy transfer machine with a bounce piston.

FIG. 29 shows an energy transfer machine 700 with two pistons 710, 712. Fluid control valves 726, 728, 730, 732 regulate the flow of fluid through an evaporator 718 and a condenser 720 and into a cylinder 708. The evaporator 718 may receive energy from a flame or other heat source, such as concentrated solar energy. The piston 712 separates the gaseous fluid from the liquid fluid to avoid water hammer and to discharge liquefied fluid by pressure rather than positive displacement. A bypass valve 716 adds or subtracts gas from the cylinder 708 depending on the pressure differential when opened, to maintain correct bounce piston position. The piston 710 may be a free piston or a powered piston. The piston 712 may be a free moving piston, a powered piston or a diaphragm.

Figure 30:
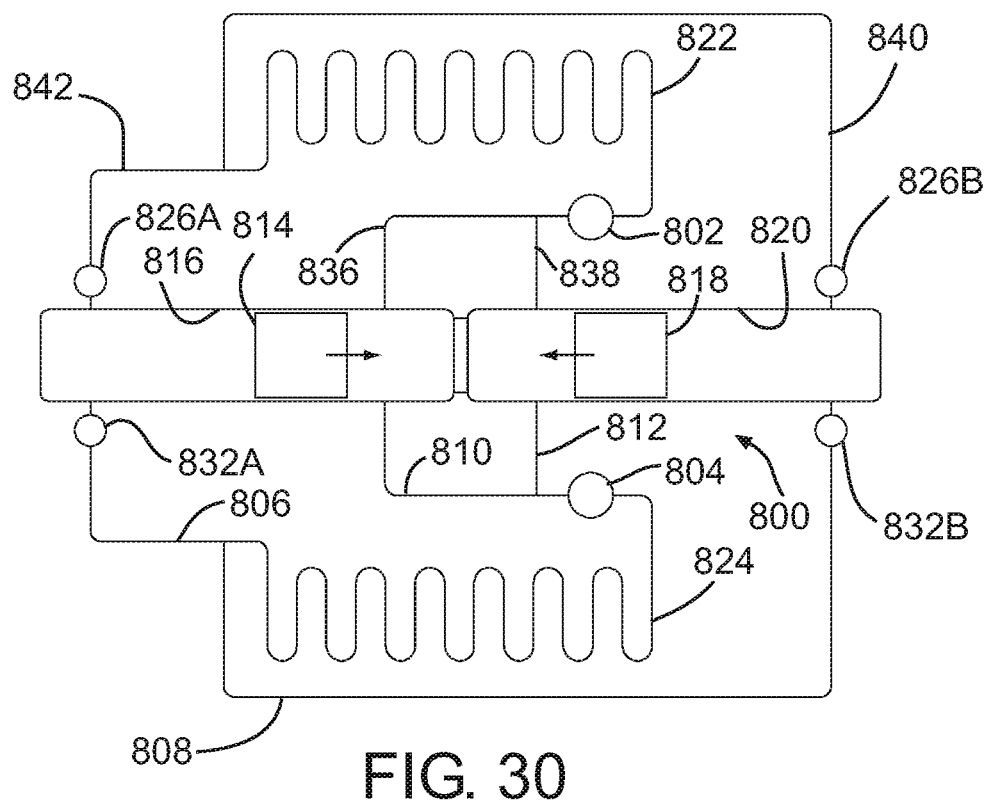
FIG. 30 is a schematic view of an energy transfer machine with two opposed pistons with shared heat exchangers and share valves.
Figure 31:
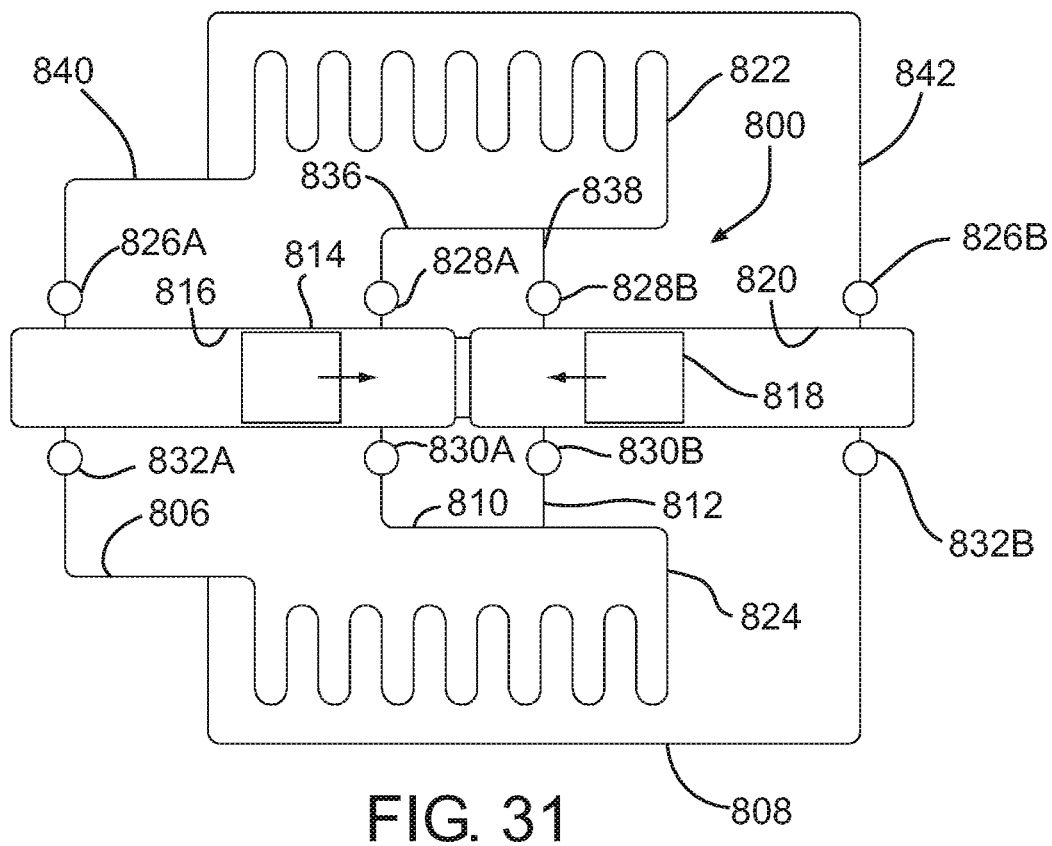
FIG. 31 is a schematic view of an energy transfer machine with two opposed pistons with shared heat exchangers.

FIGS. 30 and 31 show an energy transfer machine 800 with pistons 814, 818, cylinders 816, 820 and shared heat exchangers 822 and 824. FIG. 30 shows the same embodiment as FIG. 31, except that fluid control valves 828A, 828B are combined into a single valve 802, and fluid control valves 830A, 830B are combined into a single valve 804. In FIG. 31, fluid control valves 826A, 828A, 830A, 832A and fluid control valves 826B, 828B, 830B, 832B operate in a similar manner as valves 126, 128, 130, 132 described in the embodiments shown in FIGS. 2-7. Fluid passing through heat exchanger 822 divides into tubes 840, 842 where the fluid enters cylinders 816, 820 through hot fluid inlet valves 826A, 826B, respectively. Cold fluid is then discharged from cold fluid discharge valves 828A, 828B into tubes 836, 838, respectively where the fluid is combined and passes back into the heat exchanger 822. Cold fluid enters the cylinders 816, 820 through cold fluid inlet valves 830A, 830B, respectively. Hot fluid is discharged from hot fluid discharge valves 832A, 832B into tubes 806, 808, respectively, where the fluid is combined into heat exchanger 824, where the fluid is cooled. After passing through heat exchanger 824 the fluid divides into tubes 810, 812 where the fluid is directed through cold fluid inlet valves 830A, 830B, respectively. In the embodiment shown in FIG. 31 the cold sides of each of the cylinders 816, 820 are in the center. In some embodiments, the hot sides of each cylinder may be in the center. In other embodiments, the hot end of the cylinder 816 may meet the cold end of the cylinder 820 or vice versa, but this is not preferred.

The heat source used to create a difference in temperature between the hot reservoir 106 (FIG. 2) and the cold reservoir 108 (FIG. 2) may be from a variety of heat sources. The heat may be provided by a naturally occurring heat differential such as a) the difference between night and day heat produced by storing and using heat energy in liquid or solid masses such as water reservoirs, b) the difference between ambient air and sub-ground temperature, c) the difference between water surface and deeper water, and d) the difference between solar heated and shaded areas above ground or in space applications. The heat may be provided by a waste heat from various applications, such as a) waste heat from an industrial process, b) heat created from combusting fuels, c) heat created by an onboard electrical or other power source for land, ocean or space vehicles, d) heat generated by electrically driven devices, including, for example, computers, e) the difference in temperature in a building as compared to sub-ground or ambient air temperature and f) concentrated solar power generation. For example, the energy transfer machine may produce energy from the temperature differential that exists between night and day. Water reservoirs may be used as heat sinks and to store heat energy during the day when ambient air and solar heat provide energy to heat the hot exchanger. A reservoir of cold water is used to cool the cold exchanger or reservoir 108. The hot exchanger or reservoir 106 may be warmed by daytime air temperature, and may receive direct solar heating. The water heats up throughout the day until the increasing temperature of the water becomes too similar to the decreasing temperature of the air in the evening that it is no longer possible to generate power with the energy transfer machine. When the air temperature drops sufficiently below the now-heated water temperature, the energy transfer machine the cycle is reversed. The cycle may be reversed by configuring valves to redirect air from each of the reservoirs into the opposite engine valves, or by reversing the airflow, or the cycle may be reversed while maintaining the same direction of fluid flow by timing the valves so that the hot side 116 (FIG. 2) of the cylinder 112 (FIG. 2) is switched to the cold side 118 (FIG. 2) of the cylinder 112 (FIG. 2) and visa verse, meaning that the end that was compressing is now expanding and visa versa. The stored heat in the water reservoir dissipates into the cooler night air and will provide energy throughout the night to operate the energy transfer machine until the decreasing temperature of the water reservoir nearly reaches the increasing temperature of the air in the morning.

By using more than one water reservoir, energy may be stored in the form of heat and used during high demand hours. For example, one water reservoir may be heated during the hottest hours of the day and reserved for use during peak hours such as early morning when the air temperature is cool. Similarly, another water reservoir may be cooled at night to the temperature of the coldest night air and stored for use during the peak demand hours of the following day when the temperature is much higher. Heating and cooling these reservoirs may be done during hours of lower electrical demand when the energy transfer machine can, for example, be run at high speed to provide the fastest possible heat transfer with little energy being used to produce electricity for external use.

The energy transfer machine may be used as a small-scale or large-scale thermal energy storage device for converting electrical energy into heat energy during low electrical demand hours and then back to electrical energy again during high electrical demand hours. In other embodiments, heating elements may be used to heat thermal mass and energy transfer machine may be used to covert this heat energy to electricity at another time In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. An energy transfer machine, comprising:
    passageways defining a closed loop and containing a compressible fluid, the compressible fluid having constant phase in the closed loop;
    a pressure-displacement coupled interface on the closed loop arranged to move in a conduit between a first side of the conduit and a second side of the conduit and the conduit dividing the closed loop into a hot circuit and a cold circuit, with differential pressure between the first side and second side of the conduit during operation of the energy transfer machine causing or being caused by movement of the pressure-displacement coupled interface, each movement of the pressure-displacement coupled interface from the first side of the conduit to the second side of the conduit and back to the first side of the conduit corresponding to a cycle;
    first flow control devices on the hot circuit coordinated to permit pulsed flow through the hot circuit with energy transfer through the pressure-displacement coupled interface, the first flow control devices comprising at least a hot inlet valve on the first side of the conduit arranged to control flow between the hot circuit and the first side of the conduit and a cold discharge valve on the second side of the conduit arranged to control flow between the second side of the conduit and the hot circuit;
    second flow control devices on the cold circuit coordinated to permit pulsed flow through the cold circuit with energy transfer through the pressure-displacement coupled interface, the second flow control devices comprising at least a hot discharge valve on the first side of the conduit arranged to control flow between the cold circuit and the first side of the conduit and a cold inlet valve on the second side of the conduit arranged to control flow between the second side of the conduit and the cold circuit;

the first flow control devices and the second flow devices being coordinated by configuration of the energy transfer machine to allow the pulsed flows in the hot circuit and the cold circuit to combine to create flow around the closed loop and cause energy transfer by the cold discharge valve opening in each cycle after opening of the hot inlet valve, the cold discharge valve opening while the pressure-displacement coupled interface is moving towards the second side of the conduit; and an input-output device coupled to the pressure-displacement coupled interface to at least one of input energy into and extract energy from the pressure-displacement coupled interface.

2. The energy transfer machine of claim 1 in which the pressure-displacement coupled interface comprises a piston or diaphragm.

3. The energy transfer machine of claim 2 in which the pressure-displacement coupled interface comprises a piston and the pressure-displacement coupled interface further comprises respective rebound devices between the piston and opposed ends of the conduit.

4. The energy transfer machine of claim 2 in which the piston or diaphragm has equal surface area at each end of the piston or diaphragm against which compressible fluid exerts pressure.

5. The energy transfer machine of claim 2 in which the pressure-displacement coupled interface comprises a free piston.

6. The energy transfer machine of claim 1 in which the pressure-displacement coupled interface comprises one or more piezoelectric transducers or electroactive materials.

7. The energy transfer machine of claim 6 in which the first flow control devices and the second flow devices comprise piezoelectric or electroactive valves.

8. The energy transfer machine of claim 2 in which the first flow control devices and the second flow control devices comprise rotary valves.

9. The energy transfer machine of claim 1 in which the input-output device is configured to output electrical energy.

10. An energy transfer machine, comprising:
passageways defining a closed loop and containing a compressible fluid;
a pressure-displacement coupled interface comprising an electromagnetically controlled spinning piston contained within a conduit extending between opposed sides of the closed loop and dividing the closed loop into a hot circuit and a cold circuit, the conduit forming at least in part a cylinder;
first flow control devices on the first hot circuit coordinated to permit pulsed flow through the hot circuit with energy transfer through the pressure-displacement coupled interface, the first flow control devices comprising at least a hot inlet valve on the first side of the conduit arranged to control flow between the hot circuit and the first side of the conduit and a cold discharge valve on the second side of the conduit arranged to control flow between the second side of the conduit and the hot circuit;
second flow control devices on the cold circuit coordinated to permit pulsed flow through the cold circuit with energy transfer through the pressure-displacement coupled interface, the second flow control devices comprising at least a hot discharge valve on the first side of the conduit arranged to control flow between the cold circuit and the first side of the conduit and a cold inlet valve on the second side of the conduit arranged to control flow between the second side of the conduit and the cold circuit;
the electromagnetically controlled spinning piston having at least a portion configured to function as at least part of the first flow control devices and the second flow control devices;
the first flow control devices and the second flow devices being coordinated at least in part by electromagnetic control of the electromagnetically controlled spinning piston to allow the pulsed flows in the hot circuit and the cold circuit to combine to create flow around the closed loop; and
an input-output device coupled to the pressure-displacement coupled interface to at least one of input energy into and extract energy from the pressure-displacement coupled interface.

11. The energy transfer machine of claim 10 in which the closed loop is pressurized with differential pressure between the first side and second side of the conduit.

12. The energy transfer machine of claim 10 in which the input-output device comprises an electromagnetic device incorporating coils, and the electromagnetic device is configured to control the spinning piston.

13. The energy transfer device of claim 12 in which the electromagnetic device is configured to control the orientation of the spinning piston and coordinate the initiation of gas flow from one or more ports through the orientation of the spinning piston.

14. The energy transfer device of claim 13 further comprising at least a check valve on the one or more ports to coordinate flow of compressible fluid based on pressure differential across the check valve while the one or more ports is open due to the rotational position of the spinning piston.

15. The energy transfer machine of claim 1 in which flow around the closed loop is unidirectional.

16. The energy transfer machine of claim 1 in which the first flow control devices and the second flow control devices are controlled by electrical input.

17. A method of energy transfer, comprising:
containing compressible fluid within passageways defining a closed loop, the compressible fluid having constant phase in the closed loop;
providing a pressure-displacement coupled interface on the closed loop arranged to move in a conduit between a first side of the conduit and a second side of the conduit and the conduit dividing the closed loop into a hot circuit and a cold circuit, with differential pressure between the first side and second side of the conduit during operation of the energy transfer machine causing or being caused by movement of the pressure-displacement coupled interface, each movement of the pressure-displacement coupled interface from the first side of the conduit to the second side of the conduit and back to the first side of the conduit corresponding to a cycle, the pressure-displacement coupled interface containing a movable element that is responsive to pressure in the hot circuit and the cold circuit;
coordinating first flow control devices on the hot circuit to permit pulsed flow through the hot circuit with energy transfer through the pressure-displacement coupled interface, the first flow control devices comprising at least a hot compressible fluid inlet valve on the first side of the conduit arranged to control flow between the hot circuit and the first side of the conduit and a cold compressible fluid discharge valve on the second side of the conduit arranged to control flow between the second side of the conduit and the hot circuit;

coordinating second flow control devices on the cold circuit to permit pulsed flow through the cold circuit with energy transfer through the pressure-displacement coupled interface, the second flow control devices comprising at least a hot compressible fluid discharge valve on the first side of the conduit arranged to control flow between the cold circuit and the first side of the conduit and a cold compressible fluid inlet valve on the second side of the conduit arranged to control flow between the second side of the conduit and the cold circuit;

coordinating the first flow control devices and the second flow devices to allow the pulsed flows in the hot circuit and the cold circuit to combine to create flow around the closed loop and cause energy transfer by the cold compressible fluid discharge valve opening in each cycle after opening of the hot compressible fluid inlet valve, the cold compressible fluid discharge valve opening while the pressure-displacement coupled interface is moving towards the second side of the conduit; and coupling an input-output device to the pressure-displacement coupled interface to at least one of input energy into and extract energy from the pressure-displacement coupled interface.

18. The method of energy transfer of claim 17 further comprising applying a heat differential between the hot circuit and the cold circuit and coupling an output device to the pressure-displacement coupled interface to extract energy from the energy transfer device.

19. The method of energy transfer of claim 17 in which the pressure-displacement coupled interface comprises piezoelectric transducers or electroactive elements on opposed sides of the closed loop at different pressure.

20. The method of claim 17 in which
the hot circuit contains hot compressible fluid relative to the cold circuit containing cold compressible fluid.

21. The method of claim 20 in which coordinating the first flow control devices and the second flow control devices comprises:
opening the hot compressible fluid inlet valve when pressure is equalized across the hot compressible fluid inlet valve and closing the hot compressible fluid inlet valve when a predetermined volume of hot compressible fluid has passed through the hot compressible fluid inlet valve;
opening the cold compressible fluid discharge valve when pressure is equalized across the cold compressible fluid discharge valve and closing the cold compressible fluid discharge valve when a predetermined volume of cold compressible fluid is discharged through the cold compressible fluid discharge valve;
opening the hot compressible fluid discharge valve when pressure is equalized across the hot compressible fluid discharge valve and closing the hot compressible fluid discharge valve when a predetermined volume of hot compressible fluid has been discharged through the hot compressible fluid discharge valve; and
opening the cold compressible fluid inlet valve when pressure is equalized across the cold compressible fluid inlet valve and closing the cold compressible fluid inlet valve when a predetermined volume of cold compressible fluid has passed through the cold compressible fluid inlet valve.

22. The method of claim 21 in which movement of the movable element of the pressure-displacement coupled interface is initiated by at least one of a pulse of compressible fluid applied to the movable element and energy applied through the input-output device.

23. The method of claim 17 in which flow around the closed loop is unidirectional.

24. The method of claim 17 further comprising storing energy during the day in one or more heat energy storage masses and using this stored energy to create power at night.

25. The method of claim 24 in which one or more water reservoirs are used at least as part of the one or more heat energy storage masses.

26. The method of claim 17 in which the method is operated with reversal of the heat energy flow direction between the hot circuit and the cold circuit.

27. The method of claim 26 in which reversing energy flow comprises reversing flow of fluid through the closed loop, or changing the energy flow direction without changing the fluid flow direction by switching the hot and cold sides of the pressure-displacement coupled interface.

28. The method of claim 27 in which reversing energy flow is accomplished by changing the timing of flow control devices.

29. The method of claim 17 in which the pressure-displacement coupled interface comprises a piston, diaphragm, piezoelectric transducer or electroactive material having a variable stroke and further comprising controlling the variable stroke by operation of the first flow control devices and the second flow control devices.

30. The method of claim 17 further comprising coupling a part of the hot circuit to a part of the cold circuit to transfer energy between the hot circuit and the cold circuit.

31. The method of claim 30 in which the hot circuit passes through a heat source and the cold circuit passes through a heat sink, and the part of the hot circuit that is coupled to the part of the cold r circuit is upstream of the heat source and the part of the cold circuit that is coupled to the part of the hot circuit occurs upstream of the heat sink.

32. The energy transfer machine of claim 1 further comprising a part of the hot circuit being coupled to a part of the cold circuit to transfer energy between the hot circuit and the cold circuit.

33. The energy transfer machine of claim 32 in which the hot circuit passes through a heat source and the cold circuit passes through a heat sink, and the part of the hot circuit that is coupled to the part of the cold circuit is upstream of the heat source and the part of the cold circuit that is coupled to the part of the hot circuit occurs upstream of the heat sink.

34. The energy transfer machine of claim 1 in which:
the pressure-displacement coupled interface comprises a piston, diaphragm, piezoelectric transducer or electroactive material;
the piston, diaphragm, piezoelectric transducer or electroactive material is movable under differential pressure between the hot circuit and the cold circuit;
piston, diaphragm, piezoelectric transducer or electroactive material has a variable stroke; and
the first flow control devices and the second flow control devices are controllable to vary the variable stroke of the piston, diaphragm, piezoelectric transducer or electroactive material.

35. The energy transfer machine of claim 34 in which a part of the hot circuit is a coupled to a part of the cold circuit to transfer energy between the hot circuit and the cold circuit.

36. The energy transfer machine of claim 1 in which the pressure-displacement coupled interface comprises an element movable within a conduit extending between intake and discharge portions of the hot circuit and between discharge and intake portions of the cold circuit;

the element has a variable stroke; and the first flow control devices and the second flow control devices are controllable to vary the variable stroke of the element.

37. The energy transfer machine of claim 36 in which the pressure-displacement coupled interface comprises a piston, diaphragm, piezoelectric transducer or electroactive material.

38. The energy transfer machine of claim 36 in which the pressure-displacement coupled interface comprises a free piston.

39. The energy transfer machine of claim 38 in which a part of the hot circuit is a coupled to a part of the cold circuit to transfer energy between the hot circuit and the cold circuit.

40. An energy transfer machine, comprising:

passageways defining a loop and containing a compressible fluid;

a pressure-displacement coupled interface on the loop arranged to move in a conduit between a first side of the conduit and a second side of the conduit and the conduit dividing the loop into a hot circuit and a cold circuit, with differential pressure between the first side and second side of the conduit during operation of the energy transfer machine causing or being caused by movement of the pressure-displacement coupled interface, each movement of the pressure-displacement coupled interface from the first side of the conduit to the second side of the conduit and back to the first side of the conduit corresponding to a cycle, the pressure-displacement coupled interface comprising an element that is movable under differential pressure between the hot circuit and the cold circuit and the element having a variable stroke;

first flow control devices on the hot circuit coordinated to permit pulsed flow through the hot circuit with energy transfer through the pressure-displacement coupled interface, the first flow control devices comprising at least a hot inlet valve on the first side of the conduit arranged to control flow between the hot circuit and the first side of the conduit and a cold discharge valve on the second side of the conduit arranged to control flow between the second side of the conduit and the hot circuit;

second flow control devices on the cold circuit coordinated by configuration of the energy transfer machine to permit pulsed flow through the cold circuit with energy transfer through the pressure-displacement coupled interface, the second flow control devices comprising at least a hot discharge valve on the first side of the conduit arranged to control flow between the cold circuit and the first side of the conduit and a cold inlet valve on the second side of the conduit arranged to control flow between the second side of the conduit and the cold circuit;

the first flow control devices and the second flow devices being coordinated to allow the pulsed flows in the hot circuit and the cold circuit to combine to create flow around the loop;

the first flow control devices and the second flow control devices being controllable to vary the variable stroke of the element; and an input-output device coupled to the pressure-displacement coupled interface to at least one of input energy into and extract energy from the pressure-displacement coupled interface.

41. The energy transfer machine of claim 40 in which the pressure-displacement coupled interface comprises a piston and rebound devices between the piston and opposed ends of the conduit.

42. The energy transfer machine of claim 41 in which the element has equal surface area at each end of the element against which compressible fluid exerts pressure.

43. The energy transfer machine of claim 42 in which the element comprises a free piston.

44. The energy transfer machine of claim 40 in which the element comprises one or more piezoelectric transducers or electroactive materials arranged to move in response to pressure differential between the hot circuit and cold circuit.

45. The energy transfer machine of claim 44 in which the first flow control devices and the second flow devices comprise piezoelectric or electroactive valves.

46. The energy transfer machine of claim 40 in which the first flow control devices and the second flow control devices comprise rotary valves.

47. The energy transfer machine of claim 40 further comprising a part of the hot circuit being coupled to a part of the cold circuit to transfer energy between the hot circuit and the cold circuit.

48. The energy transfer machine of claim 47 in which the hot circuit passes through a heat source and the cold circuit passes through a heat sink, and the part of the hot circuit that is coupled to the part of the cold circuit is upstream of the heat source and the part of the cold circuit that is coupled to the part of the hot circuit occurs upstream of the heat sink.

49. The energy transfer machine of claim 40 in which:

the element is movable within a conduit extending between an intake and a discharge of the hot circuit and between a discharge and an intake of the cold circuit;

the first flow control devices comprise respective valves on the intake and the discharge of the hot circuit; and the second flow control devices comprise respective valves on the intake and the discharge of the cold circuit.

50. The energy transfer machine of claim 49 in which:

the hot circuit passes through a heat source;

the cold circuit passes through a heat sink; and the intake of the hot circuit is a coupled to the intake of the cold circuit to transfer heat energy between the hot circuit and the cold circuit.

51. The energy transfer machine of claim 50 in which the element comprises a piston, diaphragm, piezoelectric transducer or electroactive element.

52. The energy transfer machine of claim 50 in which the element comprises a free piston.

53. The energy transfer machine of claim 1 in which in a power generation mode of operation of the energy transfer machine, the energy transfer machine is configured to cause the cold inlet valve to close before the hot discharge valve closes.

54. The energy transfer machine of claim 1 in which in a power generation mode of operation of the energy transfer machine, the energy transfer machine is configured to cause the hot inlet valve to remain open during a greater total piston displacement than the total piston displacement when the hot discharge valve is open.

55. The energy transfer machine of claim 1 in which in a power generation mode of operation of the energy transfer machine, the energy transfer machine is configured to cause the cold discharge valve to remain open during a greater total piston displacement than the total piston displacement when the cold inlet valve is open.

56. The energy transfer machine of claim 1 in which in a power generation mode of operation of the energy transfer machine, the energy transfer machine is configured to cause the cold discharge valve to remain open longer than the cold inlet valve.

57. The energy transfer machine of claim 1 further comprising a heat exchanger connected between the cold circuit and the hot circuit.

58. The method of claim 17 in which in a power generation mode of operation the cold inlet valve closes before the hot discharge valve closes.

59. The method of claim 17 in which in a power generation mode of operation the hot inlet valve remains open during a greater total piston displacement than the total piston displacement when the hot discharge valve is open.

60. The method of claim 17 in which in a power generation mode of operation the cold discharge valve remains open during a greater total piston displacement than the total piston displacement when the cold inlet valve is open.

61. The method of claim 17 in which in a power generation mode of operation the cold discharge valve remains open longer than the cold inlet valve.

62. The method of claim 17 further comprising exchanging heat between the hot circuit and the cold circuit through a heat exchanger connected between the cold circuit and the hot circuit.

* * * * *